(12) United States Patent
Matyjaszewski et al.

(10) Patent No.: US 6,759,491 B2
(45) Date of Patent: Jul. 6, 2004

(54) SIMULTANEOUS REVERSE AND NORMAL INITIATION OF ATRP

(75) Inventors: Krzysztof Matyjaszewski, Pittsburgh, PA (US); Jérôme Gromada, Libercourt (FR); Mei Li, Mars, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 0 days.

(21) Appl. No.: 10/271,025

(22) Filed: Oct. 15, 2002

(65) Prior Publication Data

US 2003/0139547 A1 Jul. 24, 2003

Related U.S. Application Data

(60) Provisional application No. 60/329,232, filed on Oct. 12, 2001.

(51) Int. Cl.[7] .................................................. C08F 4/42

(52) U.S. Cl. ........................ 526/90; 526/91; 526/227; 526/206; 526/236; 526/219.6

(58) Field of Search ........................ 526/90, 91, 227, 526/206, 236, 219.6

(56) References Cited

U.S. PATENT DOCUMENTS

| | | |
|---|---|---|
| 3,183,217 A | 5/1965 | Semiuk et al. |
| 3,959,225 A | 5/1976 | Kuntz |
| 4,007,165 A | 2/1977 | MacLeay et al. |
| 4,374,751 A | 2/1983 | Dudgeon |
| 4,728,706 A | 3/1988 | Farnham et al. |
| 4,940,648 A | 7/1990 | Geiger |
| 4,954,416 A | 9/1990 | Wright et al. |
| 5,089,135 A | 2/1992 | Yoneyama et al. |
| 5,169,914 A | 12/1992 | Kaszas et al. |
| 5,312,871 A | 5/1994 | Mardare et al. |
| 5,405,913 A | 4/1995 | Harwood et al. |
| 5,451,647 A | 9/1995 | Faust et al. |
| 5,470,928 A | 11/1995 | Harwood et al. |
| 5,510,307 A | 4/1996 | Narayanan et al. |
| 5,763,548 A | 6/1998 | Matyjaszewski et al. |
| 5,789,487 A | 8/1998 | Matyjaszewski |
| 5,807,937 A | 9/1998 | Matyjaszewski et al. |
| 5,910,549 A | 6/1999 | Matyjaszewski |
| 5,945,491 A | 8/1999 | Matyjaszewski |
| 6,111,022 A | 8/2000 | Matyjaszewski et al. |

(List continued on next page.)

FOREIGN PATENT DOCUMENTS

| | | |
|---|---|---|
| EP | 034102 | 11/1989 |
| EP | 0870809 | 10/1998 |
| WO | WO 97 18247 A | 5/1997 |
| WO | WO 98/01480 | 1/1998 |
| WO | WO 00 47634 A | 8/2000 |
| WO | WO 00/56795 | 9/2000 |

OTHER PUBLICATIONS

"Living"/Controlled Radical Polymerization, Transition–Metal–Catalyzed Atom Transfer Radical Polymerization in the Presence of a Conventional Radical Initiator, *Macromolecules* 1995, 28, 7572–7573, Wang et al.

U.S. patent application Ser. No. 09/534,827, filed Mar. 23, 2000 with Preliminary Amendment (Attorney Docket No. 00093).

(List continued on next page.)

*Primary Examiner*—William Cheung
(74) *Attorney, Agent, or Firm*—Kirkpatrick & Lockhart LLP

(57) ABSTRACT

The use of concurrent reverse and normal initiation processes in an ATRP enables the use of highly active catalysts under "reverse ATRP" conditions and leads to the synthesis of well-defined polymers with low molecular weight distributions while employing much lower levels of the transition metal in the system. This dual activation/initiating system allows use of active catalysts that are added to the reaction in an oxidatively stable form. The benefits of this dual initiating system can be attained in bulk, solution and multi-phase ATRP processes, including emulsions, mini-emulsions and polymerization from surfaces.

43 Claims, 16 Drawing Sheets

U.S. PATENT DOCUMENTS

| | | | |
|---|---|---|---|
| 6,121,371 A | 9/2000 | Matyjaszewski | |
| 6,124,411 A | 9/2000 | Matyjaszewski | |
| 6,162,882 A | 12/2000 | Matyjaszewski | |
| 6,288,186 B1 | 9/2001 | Matyjaszewski | |
| 6,407,187 B1 | 6/2002 | Matyjaszewski | |
| 6,512,060 B1 | 1/2003 | Matyjaszewski | |
| 6,538,091 B1 | 3/2003 | Matyjaszewski et al. | |
| 6,541,580 B1 * | 4/2003 | Matyjaszewski et al. | 525/90 |
| 6,624,262 B2 | 9/2003 | Matyjaszewski | |
| 6,624,263 B2 | 9/2003 | Matyjaszewski | |
| 6,627,314 B2 | 9/2003 | Pyun et al. | |
| 2002/0128405 A1 | 9/2002 | Matyjaszewski | |
| 2002/0183473 A1 | 12/2002 | Matyjaszewski | |
| 2003/0139553 A1 | 7/2003 | Matyjaszewski | |

OTHER PUBLICATIONS

U.S. patent application Ser. No. 10/289,545, filed Nov. 7, 2002 with Preliminary Amendment (Attorney Docket No. 00163DIVCON).

Matyjaszewski, K.; Editor *Controlled/Living Radical Polymerization. Progress in ATRP, NMP, and RAFT. In: ACS Symp. Ser.*, 2000; 768, 2000., Chapter 19 "Reverse Atom Transfer Radical Polymerization Using AIBN or BPO as Initiator" pp. 263–275.

Matyjaszewski, K.; Xia, J. *Chem. Rev.* 2001, 101, 2921–2990.

Kamigatto, M.; Ando, T.; Sawamoto, M. *Chem. Rev.* 2001, 101, 3689–3745.

Wang, J.–S.; Matyjaszewski, K., *J. Am. Chem. Soc.* 1995, 117, 5614–5615.

Wang., J–S; Matyjaszewski, K., *Macromolecules* 1995, 28, 7572–7573.

Xia, J.; Matyjaszewski, K. *Macromolecules* 1997, 30, 7692–7696.

Qiu, J.; Matyjaszewski, K; Thouin, L.; Amatore, C. *Macromol. Chem. Phys.* 2000, 201, 1625–1631.

Gromada, J.; Matyjaszewski, K. *Macromolecules* 2001, 34, 7664–7671.

Queffelec, J.; Gaynor, S.G.; Matyjaszewski, K. *Macromolecules* 2000, 33, 8629–8639.

Zeng, F.; Shen, Y.; Zhu, S.; Pelton, R. *Macromolecules* 2000, 33, 1628–1635.

Buback, M., Huckestein, B., Kuchta, F.D., Russell, G., Schmid, E. *Macromol. Chem. Phys.* 195, 2117–2140.

United States Patent application No. 09/359,359 filed Jul. 23, 1999. Attorney Docket No. 00169DIV3.

United States Patent application No. 10/118,519 filed Apr. 6, 2002. Attorney Docket No. 010314.

Carter et al., "Polyimide Nanofoams From Phase–Separated Block Copolymers", Electrochemical Society Proceedings, 1997, pp. 32–43, vol. 97, No. 8, Electrochemical Society, Pennington, NJ, US.

Chen et al., "Pryolytic Behavior and In–Situ Paramagnetism of Star–like C60(CH3)x(PAN)xcopolymers", European Polymer Journal, Mar. 1, 1998, pp. 421–429, vol. 34, No. 3–4, Elsevier Science Ltd., Oxford, GB.

Dorota Greszta et al., "Gradient Copolymers of Styrene and Acrylonitrille Via Atom Transfer Radical Polymerization", Polymer Preprints, Apr. 1997, pp. 709–710, vol 38(1).

Jin–Shan Wang and Krzysztof Matyjaszewski, "Controlled/"Living" Radical Polymerization. Atom Transfer Radical Polymerization in the Presence of Transition–Metal Complexes". Reprinted form the Journal of the American Chemical Society. 1995, vol. 117, No. 20.

Jin–Shan Wang and Krzysztof Matyjaszewski, "Controlled/"Living" Radical Polymerization. Halogen Atom Transfer Radical Polymerization Promoted by a Cu(I)/Cu(II) Redox Process". Reprinted from Macromolecules, 1995, 28. Department of Chemistry, Carnegie Mellon University. Received May 2, 1995; Revised Manuscript Received Aug. 14, 1995.

Krzysztof Matyjaszewski, Mingli Wei, Jianhui Xia and Nancy E. McDermott, "Controlled/"Living" Radical Polymerization of Styrene and Methyl Methacrylate Catalyzed by Iron Complexes1", Macromolecules, vol. 30, No. 26, 1997.

Krzysztof Matyjaszewski, Simion Coca, Scott G. Gaynor, Mingli Wei and Brian E. Woodworth, "Zerovalent Metals in Controlled/"Living" Radical Polymerization", Macromolecules, 1997, pp. 7348–7350, vol. 30, No. 23.

Mingli Wei, Jianhui Xia, Nancy E. McDermott and Krzysztof Matyjaszewski, "Atom Transfer Radical Polymerization of Styrene in the Presence of Iron Complexes", Polymer Preprints, 38(2), 231 (1997), Department of Chemistry, Carnegie Mellon University.

Simion Coca, Christina B. Jasieczek, Kathryn L. Beers and Krzysztof Matyjaszewski, "Polymerization of Acrylates by Atom Transfer Radical Polymerization. Homopolymerization of 2–Hydroxyethyl Acrylate", Journal of Polymer Science, 1998, pp. 1417–1424, vol. 36, Part A: Polymer Chemistry.

Seong Mu Jo et al, "Polyacrylonitrile with Low Polydispersities by Atom Transfer Radical Polymerization", Polymer Preprints, vol. 38(1) Apr. 1997, pp. 697–698.

Seong Mu Jo et al, "Effects of Various Copper Salts and Additives on Polymerization of Acrylonitrile by Atom Transfer Radical Polymerization", Polymer Preprints, vol. 38(1) Apr. 1997, pp. 699–700.

Takeichi et al., "Preparation of Porous Carbon Films by the Pyrolysis of Poly(Urethane–imide) Films and Their Pore Characteristics", Carbon, Feb. 2001, pp. 257–265, vol. 39, No. 2.

Timothy E. Patten and Krzysztof Matyjaszewski, Atom Transfer Radical Polymerization and the Synthesis of Polymeric Materials, Advanced Materials 1998 10 No. 12, 901–915.

T.E. Patten et al., "Polymers with very Low Polydispersities from Atom Transfer Radical Polymerization", Science, vol. 272, pp. 866–868, May 10, 1996.

U. Schubert et al., "Design of Effective Systems for Controlled Radical Polymerization of Styrene: Application of 4,4'–Dimethyl and 5,5'–Dimethyl 2,2'–Bipyridine Copper(ii) Complexes", Macromol. Rapid Commun., vol. 20, No. 6, pp. 351–355, 1999.

* cited by examiner

Bulk polymerization, 90 °C,
$[BA]_0=6.62$ M; $[RX]_0=0.033$ M; $[Cu/L]_0=0.0033$ M; $[AIBN]_0=0.0020$ M

SIMULTANEOUS REVERSE AND NORMAL INITIATION OF ATRP

CROSS REFERENCE TO RELATED APPLICATIONS

This application is a nonprovisional application claiming priority from U.S. application Ser. No. 60/329,232 filed on Oct. 12, 2001.

FIELD OF THE INVENTION

The present invention is directed to polymerization processes and more directly related to an initiation system for controlled radical polymerization processes.

DESCRIPTION OF THE INVENTION

ATRP is one of the most successful controlled/"living" radical processes (CRP) developed and has been thoroughly described in a series of co-assigned U.S. Patents and Applications, U.S. Pat. Nos. 5,763,546; 5,807,937; 5,789,487; 5,945,491; 6,111,022; 6,121,371; 6,124,411; 6,162,882; 6,407,187; and U.S. patent application Ser. Nos. 09/018,554; 09/359,359; 09/359,591; 09/369,157; 09/534,827; 09/972,046; 09/972,056; 09/972,260; 10/034,908; and 10/098,052 all of which are herein incorporated by reference, and has been discussed in numerous publications by Matyjaszewski as co-author and reviewed in several publications.

A living polymerization process is a chain growth process without or with an insignificant amount of chain breaking reactions, such as transfer and termination reactions. Controlled/living polymerization, herein "controlled polymerization", is a chain growth process that under controlled polymerization conditions provides effective control over the chain growth process to enable synthesis of polymers with molecular weight control and narrow polydispersities or molecular weight distributions. Molecular weight control is provided by a process having a substantially linear growth in molecular weight of the polymer with monomer conversion accompanied by essentially linear semilogarithmic kinetic plots, in spite of any occurring terminations. Polymers from controlled polymerization processes typically have molecular weight distributions, characterized by the polydispersity index ("PDI"), of less than or equal to 2. The PDI is defined by the ratio of the weight average molecular weight to the number average molecular weight, $M_w/M_n$. More preferably in certain applications, polymers produced by controlled polymerization processes have a PDI of less than 1.5, and in certain embodiments, a PDI of less than 1.3 may be achieved.

Polymerization processes performed under controlled polymerizations conditions achieve these properties by consuming the initiator early in the polymerization process and, in at least one embodiment of controlled polymerization, an exchange between an active growing chain and dormant polymer chain is equivalent to or faster than the propagation of the polymer. A controlled radical polymerization ("CRP") process is a process performed under controlled polymerization conditions with a chain growth process by a radical mechanism, such as, but not limited to, atom transfer radical polymerization, stable free radical polymerization, specifically, nitroxide mediated polymerization, reversible addition-fragmentation transfer/degenerative transfer/catalytic chain transfer radical systems. A feature of controlled radical polymerizations is the existence of an equilibrium between active and dormant species. The exchange between the active and dormant species provides a slow chain growth relative to conventional radical polymerization, but all polymer chains grow at the same rate. Typically, the concentration of radicals is maintained low enough to minimize termination reactions. This exchange, under appropriate conditions, also allows the quantitative initiation early in the process necessary for synthesizing polymers with special architecture and functionality. CRP processes may not eliminate the chain breaking reactions, however, the chain breaking reactions are significantly reduced from conventional polymerization processes.

Polymers produced under controlled polymerization conditions have a degree of polymerization that may be determined from the ratio of the amount of consumed monomer to the initiator, a polydispersity close to a Poisson distribution and functionalized chain ends. The level of control attained in a particular polymerization process is typically monitored by analyzing the kinetics of the polymerizations, the evolution of molecular weights, polydispersities and functionalities with conversion.

The equilibrium required for ATRP controlled polymerization processes has been attained using two different initiation methods or activation reactions called respectively, normal and reverse ATRP. See, for example, U.S. Pat. No. 5,763,548.

Unless otherwise indicated, all numbers expressing quantities of ingredients, time, temperatures, and so forth used in the present specification and claims are to be understood as being modified in all instances by the term "about." Accordingly, unless indicated to the contrary, the numerical parameters set forth in the following specification and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, may inherently contain certain errors necessarily resulting from the standard deviation found in their respective testing measurements.

Normal ATRP Initiation

Normal ATRP processes are initiated by the redox reaction between a initiator comprising a transferable atom or group and catalyst comprising a transition metal complex in a lower oxidation state. A redox reaction occurs between the initiator and the transition metal complex. The transferable atom or group is a group that may be homolytically cleaved from an initiator by the catalyst, thereby oxidizing the catalyst to a higher oxidation state and forming a radical thereby activating the initiator residue for monomer addition. After initiation, an ATRP process, generally, is based a dynamic equilibrium between a transition metal complex reversibly activating and deactivating the polymer chain via a similar homolytic atom or group transfer via a redox reaction. Subsequent to monomer addition, the polymer chain is activated by the removal of a transferable atom or group from the end of the polymer chain and may then deactivated by return of a transferable atom or group in the reverse reaction, the returning atom or group may not necessarily be the same atom or group removed in the activating step or even from the same transition metal complex. The equilibrium between the growing and dormant chains allows the synthesis of well-defined polymers with complex architecture. During the dynamic equilibrium the transition metal complex cycles between a lower oxidation state and a higher oxidation state. The advantages of normal initiation of ATRP include that the initiator includes the transferable atom or group needed to terminate each polymer chain, therefore no additional transferable atoms or groups are required to be added by other components of the polymerization process in order to attain polymers with the desired degree of polymerization at high conversion of monomer(s) to polymer. Therefore, only enough transition metal complex in the lower oxidation state is needed to provide suitable catalytic activity to the process. By suitable catalytic activity, it is meant that the polymerization comprises an amount of catalyst needed to drive the reaction to a desired degree of polymerization in a time that allows appropriate heat control to allow for a controlled reaction. The disadvantages of normal initiation of ATRP are that the transition metal complex in the lower oxidation state is less stable than the transition metal complex in the higher oxidation state and, typically without special handling procedures, has to be prepared at the time of reaction or stored under an inert atmosphere. Further, care has to be taken with the other reagents in the reaction to reduce the level of oxidants in the system to retain an active catalyst system, since if such termination reactions occur, the amount of catalyst in the lower oxidation state may be reduced, thereby also reducing the rate of polymerization.

Any transition metal complex capable of maintaining the dynamic equilibrium with the polymer chain may be used as the redox catalyst in ATRP, as discussed in the cited art, after consideration of oxidation states, complex formation with suitable ligands and redox potential of the resulting complex to provide a catalyst for the desired reaction. A wide variety of ligands have been developed to prepare transition metal catalyst complexes that display differing solubility, stability and activity.

The embodiments of the present invention described herein exemplify the process by focusing on the use of copper as the transition metal and butyl acrylate as the monomer but as described in the cited art other transition metals can be used and a wide range of radically (co) polymerizable monomers can be used. Any radically (co) polymerizable monomer can be polymerized by preparing a catalyst complex with appropriate solubility, stability and activity as taught in the cited references and the relevant art.

Reverse ATRP Initiation

In reverse ATRP, as opposed to normal ATRP, the transferable atom or group begins as a counterion or ligand on the transition metal complex in the higher oxidation state. Generally, the higher oxidation state of a transition metal complex is an oxidatively more stable state of the complex. The reaction is then initiated by a generation of a radical by known processes, such as, by decomposition of a standard free radical initiator which may participate in a redox reaction with the transition metal forming the transition metal complex in the lower oxidation state, the activator state, and a molecule with a transferable atom suitable for initiation of an ATRP reaction. In this regard, a reverse ATRP process allows for controlled polymerization starting from lower cost, more oxidatively stable Cu(II) complexes, however, reverse ATRP systems require high catalyst concentration in order to introduce the appropriate concentration of radically transferable atoms or groups to the reaction in order to maintain a controlled polymerization and to attain polymers of the desired molecular weight at high conversion of monomer to polymer. Due to the high concentration of catalysts required in reverse ATRP processes, only transition metal complexes with lower catalytic activity, such as, catalysts comprising bipyridine type ligands have been successfully employed. As used herein, catalysts employed in ATRP polymerizations resulting a rate of polymerization greater than an ATRP polymerization comprising a bipyridine ligand under similar conditions is considered highly active, preferable the rate of reaction is 1.5 times the rate of the reaction using a bipyridine ligand under similar conditions.

A standard free radical initiator is essentially the source of free radicals required to initiate the polymerization of the radically polymerizable monomers. The free radicals may be formed by thermal or photoinduced decomposition of the initiator or by a redox reaction with the initiator. Typical standard free radical initiators include, but are not limited to, dialkyl diazenes, including, azobis(isobutyronitrile) ("AIBN"), dimethyl 2,2'-azobisisobutyrate (MAIB), 1,1'-azobis(1-cylcohexanenitrile), 2,2'-azobis(2,4,4-trimethylpentane), and azobis-2,4-dimethylvaleronitrile, polymeric or oligomeric materials comprising azo, —N=N—, groups, peroxides such as acyl and diacyl peroxides, alkyl peroxides, dialkyl peroxydicarbonates, hydroperoxides, peresters, and inorganic peroxides, benzoyl peroxide (BPO) or a peroxy acid such as peroxyacetic acid or peroxybenzoic acid, styrenes and acrylates. Standard commercial free radical initiators, such as V-044, that initiate radical polymerizations are typically generated by thermal or photochemical homolytic cleavage of covalent bonds to form the radicals.

Because a typical reverse ATRP process depends on the thermal decomposition of the standard free radical initiator, a further limitation of a reverse ATRP process has been the narrow operating temperature range to ensure fast decomposition and rapid initiation of the process at low conversion of monomer to polymer to provide polymers with narrow molecular weight distribution.

ATRP catalysts vary in catalytic activity based upon the properties of the transition metal, the ligands and the temperature and polarity of the reaction medium, as well as other factors. More active catalytic systems are generally less oxidatively stable in their lower oxidation states, such as the Cu(I) complexes discussed herein to exemplify the processes. Such catalysts in their lower oxidation states may create handling problems. For instance, trace levels of oxygen should be to be removed from the system prior to addition of the catalyst in a lower oxidation state and the catalyst complex may not easily be prepared in advance of the polymerization process. Reverse initiation of ATRP, using more stable Cu(II) complexes in the initiating step, may be a convenient method to circumvent these handling problems. The preparation of oxidatively stable, active catalyst precursors, will allow larger scale manufacture, storage and shipment of catalyst systems.

Unfortunately, the known reverse ATRP initiation methods are difficult to apply to controlled polymerization using highly active catalysts such as CuBr/Me$_6$-TREN for the preparation of lower molecular weight polymers at lower temperatures, or lower degrees of polymerization. The concentration of the catalyst to be added to a reverse ATRP is also related to the amount of added initiator and the temperature at which the initiator undergoes rapid decomposition. Additionally, rapid decomposition of the initiator is required to ensure each polymer chain grows simultaneously to synthesize polymers with narrow molecular weight distribution. When using highly active catalysts in normal ATRP reactions the catalyst concentration is low, for instance, the concentration of highly active catalysts may be less than 10% of that used with lower activity ligands and may be added at molar concentrations less than the initiator. Highly active catalysts may additionally allow a reduction in the reaction temperature without reducing polymerization rate. See Table 1, describes a bulk

TABLE 1

Bulk polymerization of acrylates using $CuBr/Me_6$-TREN as catalyst.

| $[catalyst]_0/$ $[2\text{-}EBP]_0$ | temp. (° C.) | time (h) | conversion (%) | $M_{n,GPC}$ | $M_{n,th}$ | $M_w/M_n$ |
|---|---|---|---|---|---|---|
| 1.0 | 23 | 0.50 | 66 | 17900 | 13200 | 1.24 |
| 0.1 | 23 | 5.00 | 94 | 26200 | 24700 | 1.13 | polymerization of acrylates using an active catalyst at 23° C. The polymerization process was conducted twice, at initial molar concentration ratios of catalyst to initiator of 1.0 and 0.1. Both polymerizations resulted the synthesis of polymers with low molecular weight distributions.

A reverse ATRP using AIBN as an initiator would require an initial molar concentration ratio of catalyst to initiator of approximately 1.6 and an operating temperature of over 100° C. to result in similar polymers. The net result of increased catalytic activity is that an ATRP reaction may be driven to higher conversion and synthesize polymers displaying narrower MWD while employing less transition metal in the system and operating at a lower temperature.

However, as indicated above, when a highly active catalyst is used in a reverse ATRP, the polymerization is not easily controlled. See Table 2 for the initial concentrations of the polymerization conducted at 90° C.

TABLE 2

Reverse ATRP of butyl acrylate with active TREN based catalyst

| monomer | Initiator (AIBN) | $CuBr_2$ | Ligand |
|---|---|---|---|
| 100 | 0.03 | 0.05 | 0.05 |

Since the amount of catalyst added to the system is dependent on the amount of initiator present and not the activity of the catalyst, an excessive amount of catalyst is required, and the resulting polymerization is uncontrolled. To supply a sufficient quantity of transferable atom or group to the polymerization the initial concentration of catalyst was determined from Equation 1, assuming a standard free radical initiator efficiency of 80%.

$[Cu(II)]_0/[AIBN]_0=2*0.8$  Equation 1 Reverse ATRP under these conditions, resulted polymerization with polymers having a nonlinear increase in molecular weight versus monomer conversion and though the molecular weight distribution was low, 1.6, the molecular weight distribution increased with monomer conversion. See FIG. 1.

However, an advantage of reverse initiation of an ATRP process is that the catalyst may be supplied in its more stable higher oxidation state. One disadvantage of reverse initiation of ATRP is that the amount of initiator in the process is dependent of the amount of transition metal complex in the higher oxidation state. The activity of the formed transition metal complex is not of primary concern, therefore more active catalysts may not provide a controlled polymerization at high ratios of catalyst to monomer.

The present invention is related to a polymerization process comprising a dual initiation system for atom transfer radical polymerization ("ATRP"). The initiation system comprises both standard free radical initiators and initiators comprising a transferable atom or group. In certain embodiments the initiation system of the present invention comprises initiation of a reverse ATRP and normal ATRP process. The dual initiation system may be used to prepare any type of polymer that may be prepared by ATRP, such as, but not limited to, homopolymers, graft, branched, star, comb, bottle brush, block copolymers, gradient, alternating, as well as other polymer structures. Additionally, the dual initiation system may be utilized in atom transfer radical polymerization processes conducted in bulk, in solution, in emulsion, in miniemulsion, and in heterogeneous polymerizations from surfaces.

The features and advantages of the present invention may be better understood by reference to the accompanying figures, in which.

Dual Initiation of ATRP

Figure 1:
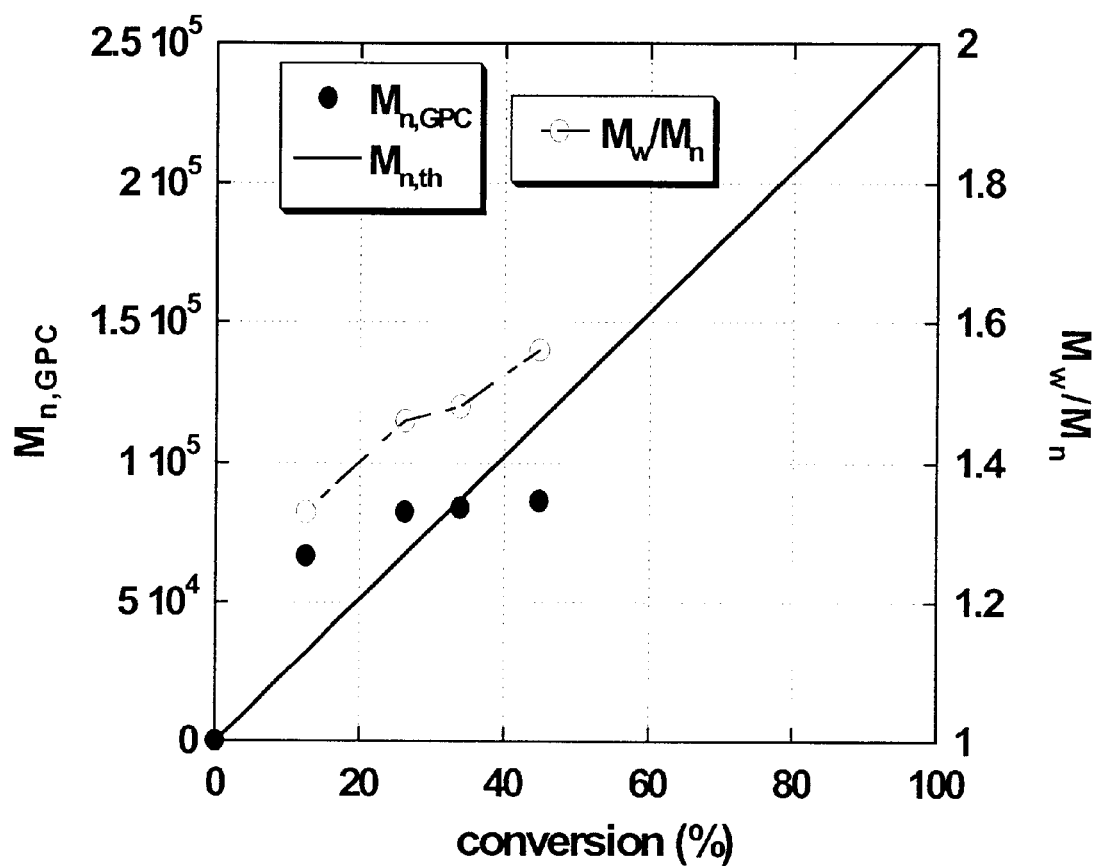
FIG. 1 is a graph of a number average molecular weight versus monomer conversion for reverse ATRP of n-butyl acrylate catalyzed by CuBr2/Me6-TREN conducted at 90° C. showing poor polymerization control.

However, providing a dual initiation process, combining both normal initiation and reverse initiation and catalyst activation, in the same polymerization process, combines the advantages of both processes while overcoming some of the limitations of each process. For example, in one embodiment of the present invention, a polymerization process involves a Simultaneous Reverse and Normal Initiation Process (SR&NI) enabling controlled/living polymerizations, using more stable, lower cost Cu(II) complexes as the precursors of the active transition metal catalyst in conjunction with a standard ATRP initiator. The polymerization process comprises a standard free radical initiator and an initiator comprising a transferable atom or group. There is no limit to the ratio of standard free radical initiators to initiators comprising transferable atom or group. For certain embodiments, the bulk of the initiating species may be normal ATRP initiators comprising transferable atoms or groups. Though not wishing to limit the scope of the present invention by a discussion of mechanism, the dual initiation process includes a series of reactions. First, the polymerization is initiated by the decomposition of the standard free radical initiator, into at least one radical. This radical may begin the polymerization of the radically polymerizable monomers under the typical free radical polymerization mechanism. However, additionally, the transition metal complex in the higher oxidation state rapidly transfers a transferable atom or group either to the radical or the radical end of a growing polymer chain. This process reduces the transition metal complex to its lower oxidation state and activator state. The transition metal complex in the lower oxidation state may then homolytically cleave the transferable atom or group from the normal ATRP initiator, such as an alkyl halide. This process forms another radical for polymerization of radically polymerizable monomers.

This activation/initiation system can readily be applied to polymerizations using macroinitiators for preparation of block or graft copolymers or for the production of materials with other polymer topology. Further the application of SR&NI can be applied to all types of ATRP including multi-phasic polymerization systems such as polymerization from surfaces or emulsion or miniemulsion processes.

The use of a transition metal complex in the higher oxidation state has the additional advantages. For instance, the transition metal complex in the higher oxidation state may remove any dissolved oxygen from the polymerization medium without reduction in catalytic activity, provided sufficient standard free radical initiator has been employed.

Since the decomposition of the standard free radical initiator takes place over time, the newly formed radicals may continuously reduce more transition metal complex to the lower oxidation state. In this way the continuous formation of activated catalyst can be tailored to compensate for any loss in catalytic activity due to termination reactions or the persistent radical effect, for example.

The embodiments in the examples of the present invention comprise use of ATRP catalysts comprising tetradentate nitrogen based ligands, see Scheme 1. One skilled in the art would readily understand from the disclosure that other catalyst systems discussed in the cited prior art could also be employed. Highly active catalysts may be preferred wherein the final concentration of transition metal in the polymer is a concern. With highly active catalysts, removal of the catalyst may be simplified or the size of equipment used for catalyst removal and recycle may be reduced thereby potentially reducing the cost of equipment and environmental impact of the process.

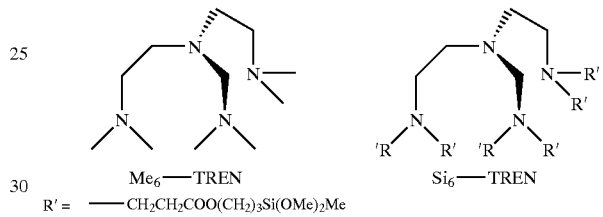

Me$_6$—TREN    Si$_6$—TREN

R' = —CH$_2$CH$_2$COO(CH$_2$)$_3$Si(OMe)$_2$Me

Scheme 1: Structure of some of the tetradentate nitrogen based ligands used in the study. Bipyridine based catalysts are not considered a highly active.

Figure 2A:
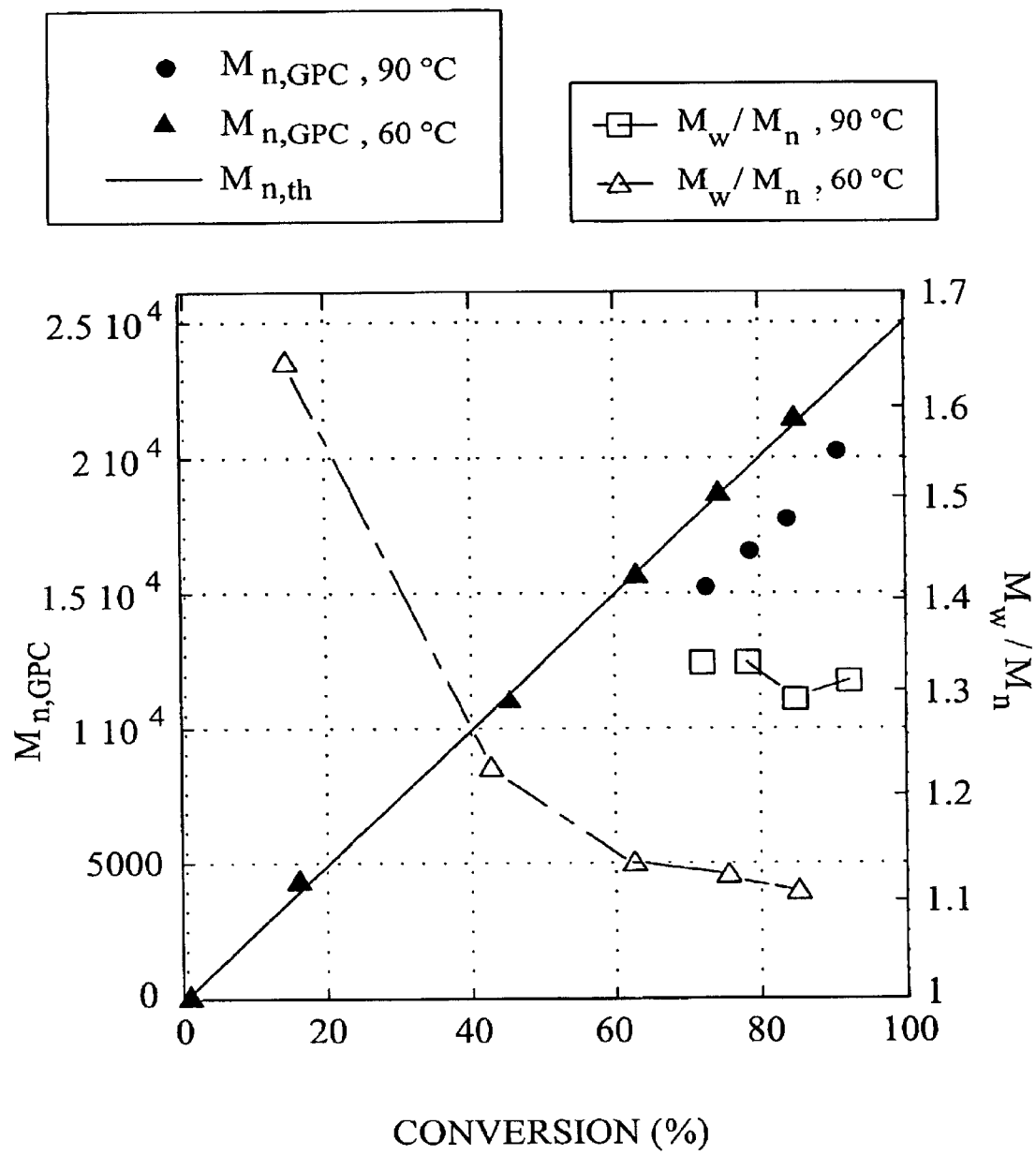
FIG. 2A is a graph of a number average molecular weight versus monomer conversion for an embodiment of an ATRP of the present invention of n-butyl acrylate initiated by both an initiator comprising a transferable atom or group and a standard free radical initiator and catalyzed by $CuBr_2/Me_6$-TREN conducted at both 60° C. and 90° C.
Figure 2B:
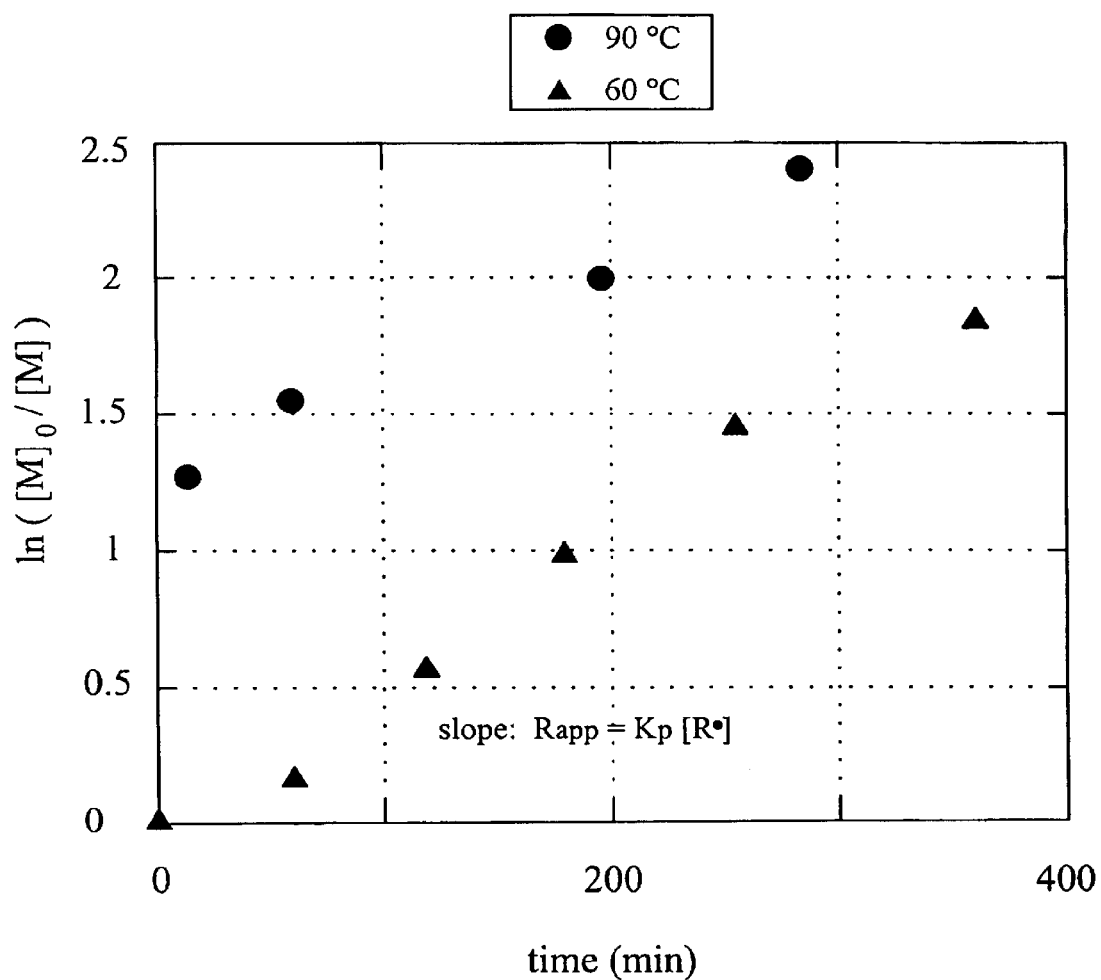
FIG. 2B is a graph of a $\ln[M]_0/[M]$ versus time for an embodiment of an ATRP of the present invention of n-butyl acrylate initiated by both an initiator comprising a transferable atom or group and a standard free radical initiator and catalyzed by $CuBr_2/Me_6$-TREN conducted at both 60° C. and 90° C.

An embodiment of the present invention comprises a initiator comprising a transferable atom or group, RX, and a standard free radical initiator, AIBN in the following initial concentrations, [RX]$_0$=0.035 M and [AIBN]$_0$=0.0021 M. Butyl acrylate, 6.97 M, was polymerized using a transition metal initially in the higher oxidation state, CuBr$_2$/Me$_6$-TREN, 0.0035 M. Even though the transition metal complex in the higher oxidation state is only sparingly soluble in the monomer, the reduced transition metal is more soluble and a controlled polymerization resulted. The results are shown in FIGS. 2A and 2B. The experiment was conducted at two temperatures 60° C. and 90° C. Better control was realized at the lower temperature polymerization.

Figure 3:
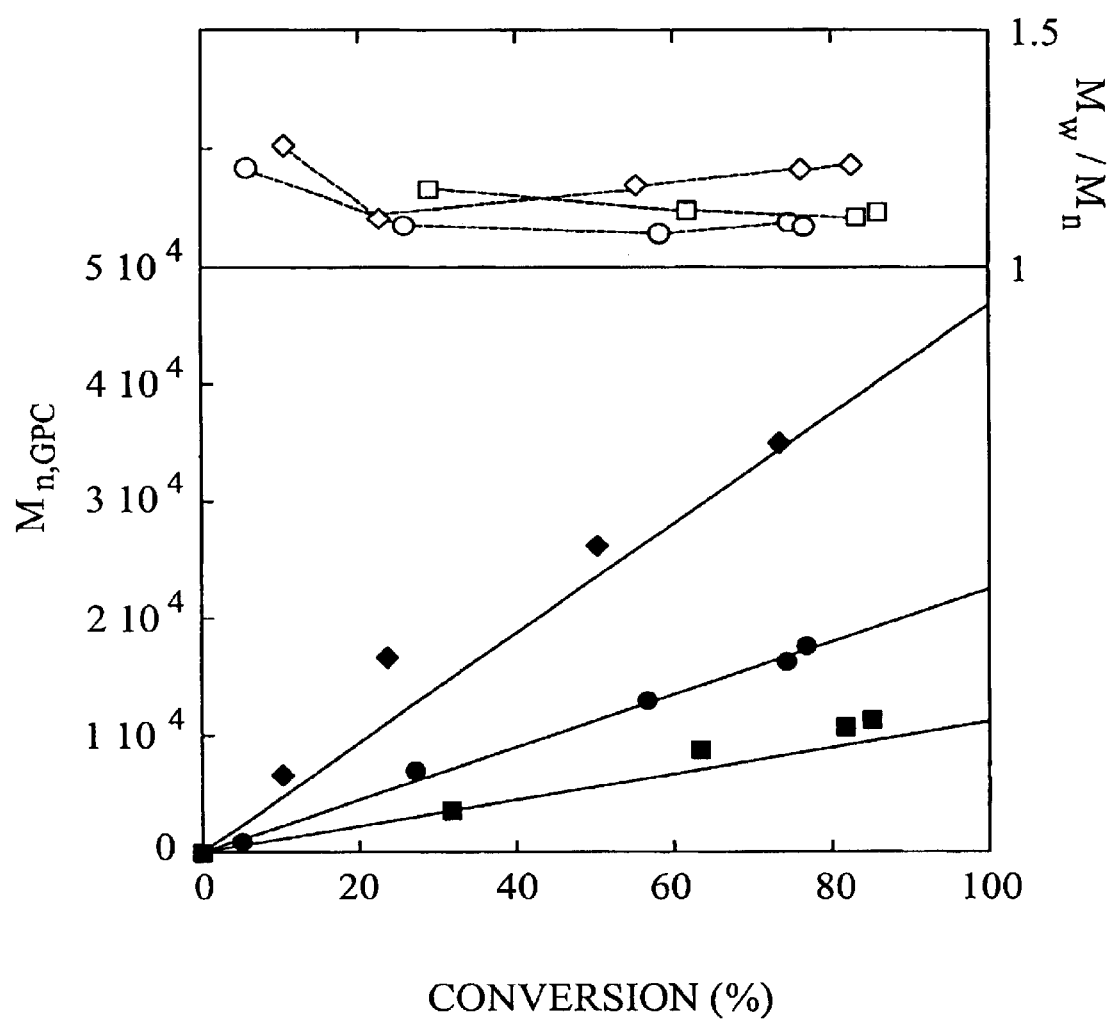
FIG. 3 is a graph of the evolution of the molecular weights (filled symbols) and polydispersities (empty symbols) versus monomer conversion using different $[RX]_0$ under homogeneous conditions. $[BA]_0$=6.62 M; $[CuBr_2/Me_6\text{-}TREN]_0$= 0.0033 M; $[MBP]_0$=0.016 M (diamonds), 0.033 M, (circles), 0,066 M (squares); $[AIBN]_0$=0.0020 M; MeOH (5 vol %) at 90° C.

An embodiment of the present invention is a dual catalyst system is exemplified by a discussion of a SR&NI system comprising a highly active ATRP catalyst, formed with both a standard free radical initiator and an normal ATRP initiator for the bulk polymerization of n-butyl acrylate (BA), FIG. 3. The initial concentration of normal ATRP initiator, MBP, was varied across the three polymerizations as can be seen in Table 3. In this initial system, although the catalyst complex is only partially soluble in the monomer, the molecular weight of the growing polymer chain increases in a linear fashion with conversion, and the resulting polymer has a narrow molecular weight distribution, M$_w$/M$_n$=1.1. Clearly this is a controlled polymerization.

TABLE 3

Initial concentration for dual initiator experiments in FIG. 3.

| $[MBP]_0$ | $[AIBN]_0$ | $[CuBr2/Me6-TREN]_0$ | $[MEOH]_0$ | Temp. | Symbol |
|---|---|---|---|---|---|
| 0.016 M | 0.0020 M | 0.0033 M | 5 vol. % | 90° C. | diamonds |
| 0.033 M | 0.0020 M | 0.0033 M | 5 vol. % | 90° C. | circles |
| 0.066 M | 0.0020 M | 0.0033 M | 5 vol. % | 90° C. | squares |

Through variation of the alkyl halide concentration in the series of experiments described in Table 3 and FIG. 3, it was shown that the theoretical molecular weight could be approximately predetermined using the initial concentration of components by Equation 1 where both RX, and the decomposition efficiency of AIBN, 80%, have to be taken into account:

$$M_n = \frac{\Delta [M]}{[RX]_0 + (2 \times 0.8 \times [AIBN]_0)} * M_0 \quad \text{equation 2}$$

For all polymers with targeted molecular weights, the molecular weight increases linearly with conversion and low polydispersities were observed ($M_w/M_n<1.15$).

One of the advantages of embodiments of the present invention is that it allows fast polymerization, with lower catalyst concentrations, while retaining the same degree of control over the polymerization. The initial concentration of transition metal complex in the higher oxidation state, $[CuBr2/Me6-TREN]_0$, was varied across the three polymerizations as can be seen in Table 4.

TABLE 4

Figure 4:
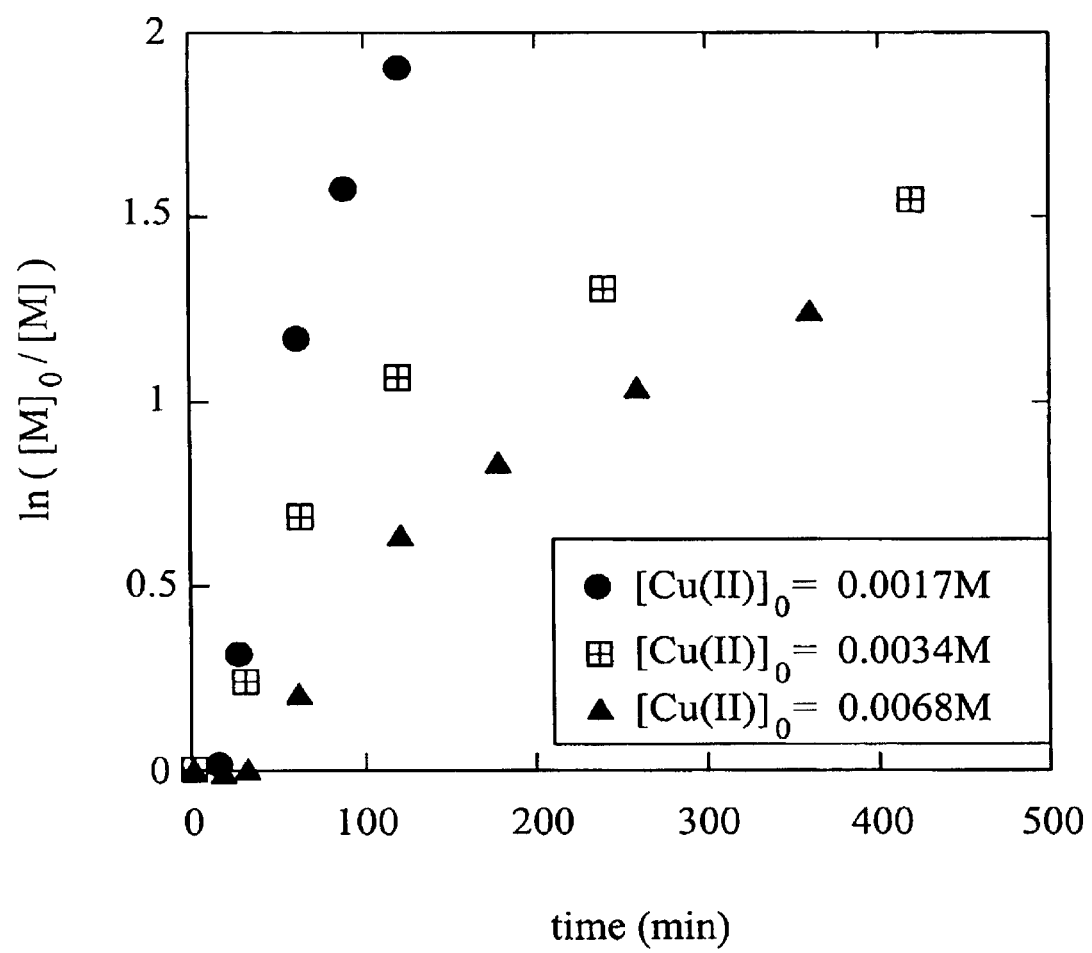
FIG. 4 is a graph of semilogarithmic plots of embodiments of the present invention using different $[Cu(II)]_0$ under homogeneous conditions $[BA]_0$=6.62 M; $[CuBr_2/Me_6TREN]_0$=0.0017–0.0068 M; $[MBP]_0$=0.033 M; $[AIBN]_0$=0.0020 M; MeOH (5 vol %) conducted at 90° C.

Initial concentrations for dual initiator experiments in FIG. 4.

| $[CuBr2/Me6-TREN]_0$ | $[AIBN]_0$ | $[MBP]_0$ | $[MeOH]_0$ | Temp. | Symbol |
|---|---|---|---|---|---|
| 0.0017 M | 0.0020 M | 0.033 M | 5 vol. % | 90° C. | Circles |
| 0.0034 M | 0.0020 M | 0.033 M | 5 vol. % | 90° C. | Squares |
| 0.0068 M | 0.0020 M | 0.033 M | 5 vol. % | 90° C. | Triangles |

The first-order kinetic plots for these polymerizations of various $[Cu(II)]_0$ are shown in FIG. 4. For this series of examples, lower initial copper (II) concentration resulted in higher rates of polymerization. This is possibly a result of more complete reduction of Cu(II) to Cu(I) at lower catalyst levels, however, even with catalyst concentration as low as 5% relative to the initiator, control of the polymerization was still observed. This observation indicates that the relative ratio of Cu(II) to Cu(I) in the reaction is, at least initially, determined by the rate of decomposition of the standard free radical initiator and the efficiency of radical reduction of Cu(II) relative to radical-radical reactions. In other words in an SR&NI system, the rate of reaction is determined both by the inherent activity of the catalyst complex and the ratio of Cu(II) to Cu(I) in the reaction among other factors. This latter ratio is determined by the decomposition of the added standard free radical generator and the selectivity of the radicals thereby formed.

Living Nature of the Dual Initiation System

Although these initial results are satisfactory, it was desirable to understand the kinetic behavior. Under the SR&NI conditions of Example 3 the rate of polymerization slows down and then stops at conversion close to 70%. This decrease of activity may be explained by three hypotheses: 1) by oxygen contamination; 2) by loss of the chain end functionality (nucleophilic substitution of the bromine atom by MeOH); or 3) by too high a concentration of Cu(II) in the system. In ATRP, the formation of dead chains by radical-radical termination reactions may cause an increase in the concentration of the polymer chain deactivator, Cu(II). However, since a low concentration of catalyst is used in highly active systems, even a low percentage of dead chains by termination reactions could convert a significant portion of lower oxidation catalyst into higher oxidation catalyst and consequently slow or even stop the polymerization. The first hypothesis was easily ruled out conducting a dual initiated polymerization in a sealed tube without oxygen contamination. This embodiment resulted in the same reduction is catalytic activity.

Figure 5:
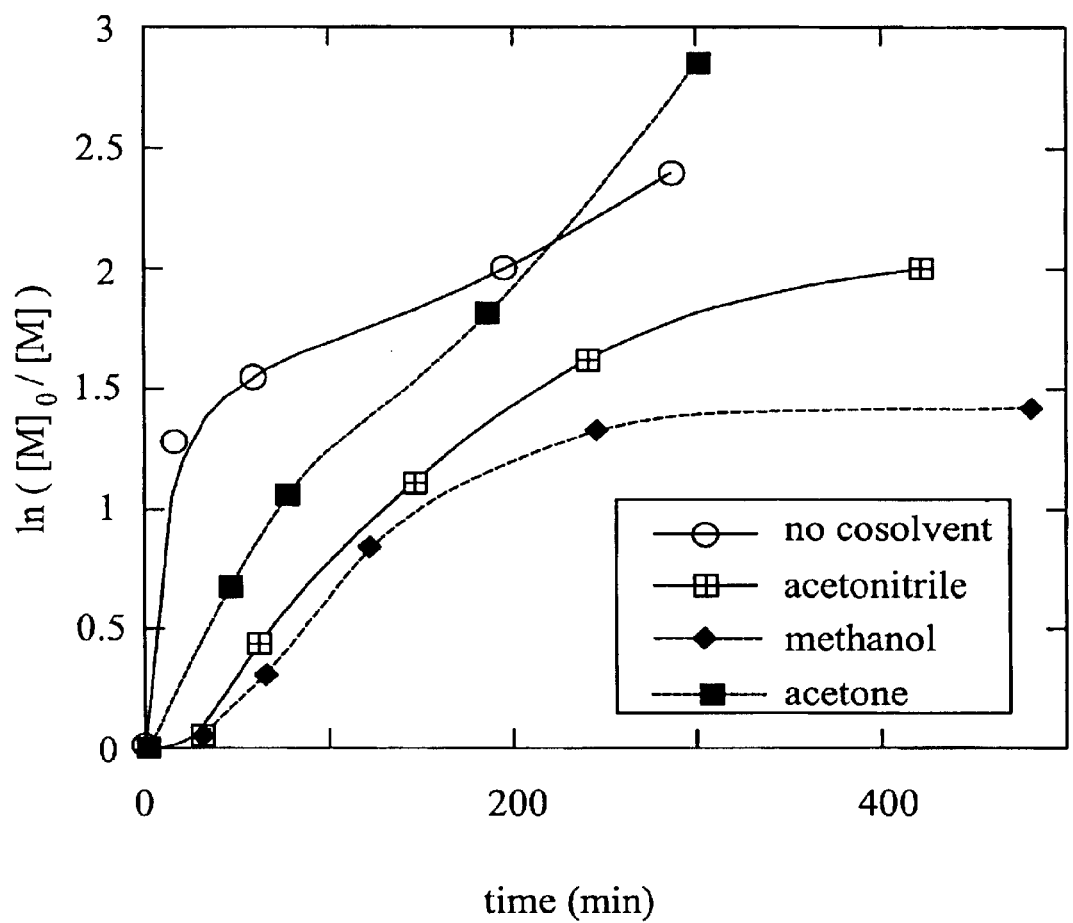
FIG. 5 is a graph of first-order kinetics plots of embodiments of the present invention using various co-solvents under homogeneous conditions $[BA]_0$=6.62 M; $[CuBr_2/Me_6\text{-}TREN]_0$=0.0033 M; $[MBP]_0$=0.016–0.066 M; $[AIBN]_0$=0.0020 M; co-solvent (5 vol %) conducted at 90° C.

In order to identify which of the remaining hypothesis caused the reduction in catalytic activity, the polymerization was carried out in different solvents to determine whether there was any loss of chain end functionality, such as by nucleophilic substitution of the bromine atom by MeOH. The effect of different solvents, added at 5% by volume to the polymerization medium, is observed in the semilogarithmic plots shown in FIG. 5. The kinetics of the polymerization are similar when MeOH or acetonitrile is used as solvent. The polymerizations start after approximately 30 minutes of an induction period and a maximum in conversion of monomer is reached within 7 hours.

On the other hand, in presence of acetone, or without any co-solvent, a faster heterogeneous polymerization with very high conversion is observed. This increased rate of polymerization may be ascribed to a lower concentration of $[Cu(II)]_0$ in solution, leading to slower deactivation of the polymer chains and consequently to a less controlled polymerization. Indeed, even though the molecular weight evolves linearly with conversion in all cases, the polydispersities are broader for the fastest polymerizations ($1.20<M_w/M_n<1.35$).

Figure 6:
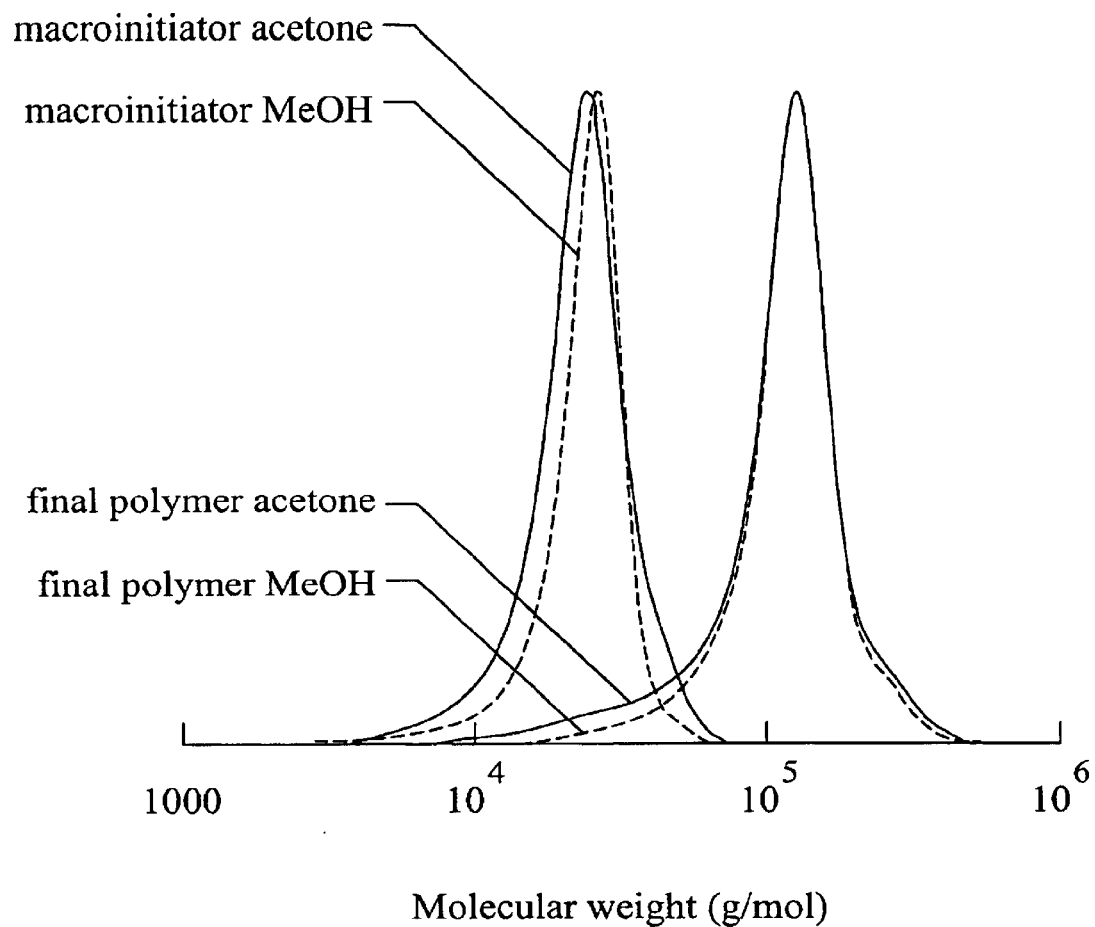
FIG. 6 is a plot of the molecular weight distribution of chain extended pBA-Br$[BA]_0$=6.62 M (12.5 mL); $[CuBr/PMDETA]_0$=0.0033 M; $[pBA]_0$=0.016–0.066 M for the solution polymerizations in acetone and methanol after 450 minutes at 90° C.

To confirm the hypothesis that it is the accumulation of Cu(II) that reduces the polymerization rate and not a reduction in the living nature of the polymer chains, polybutyl acrylate macroinitiators were prepared in acetone and MeOH solutions and were chain extended with butyl acrylate. The macroinitiators used had similar number average molecular weights, although the polydispersity was a slightly higher when the macroinitiator was prepared in presence of acetone. After chain extension with butyl acrylate, a significant increase of the molecular weight was observed but a tail and a bump on the curves for the low molecular weight species indicates the presence of non-chain extended macroinitiators, see FIG. 6. Quantification of the residual macroinitiator enabled a determination of the percent of dead chains in the macroinitiator. The percentage of chains that were not extended, dead chains, is 4 times lower when the macroinitiator was prepared in presence of MeOH (e.g. 3% vs. 12%). This observation is in good agreement with one theory of the kinetic behavior of controlled radical polymerizations. Typically, for polymerizations with a fast polymerization rate, a higher concentration of propagating radicals is present, therefore, there are potentially more radical-radical termination reactions. This experiment shows that the percentage of functionalized chains under standard SR&NI conditions is quite high, ruling out the loss of functionality by nucleophilic substitution. Thus, the loss of catalytic activity is most probably be due to the formation of a high ratio of [Cu(II)] to [Cu(I)] due to a low level of termination reactions and the low concentration of active catalyst added.

Figure 7:
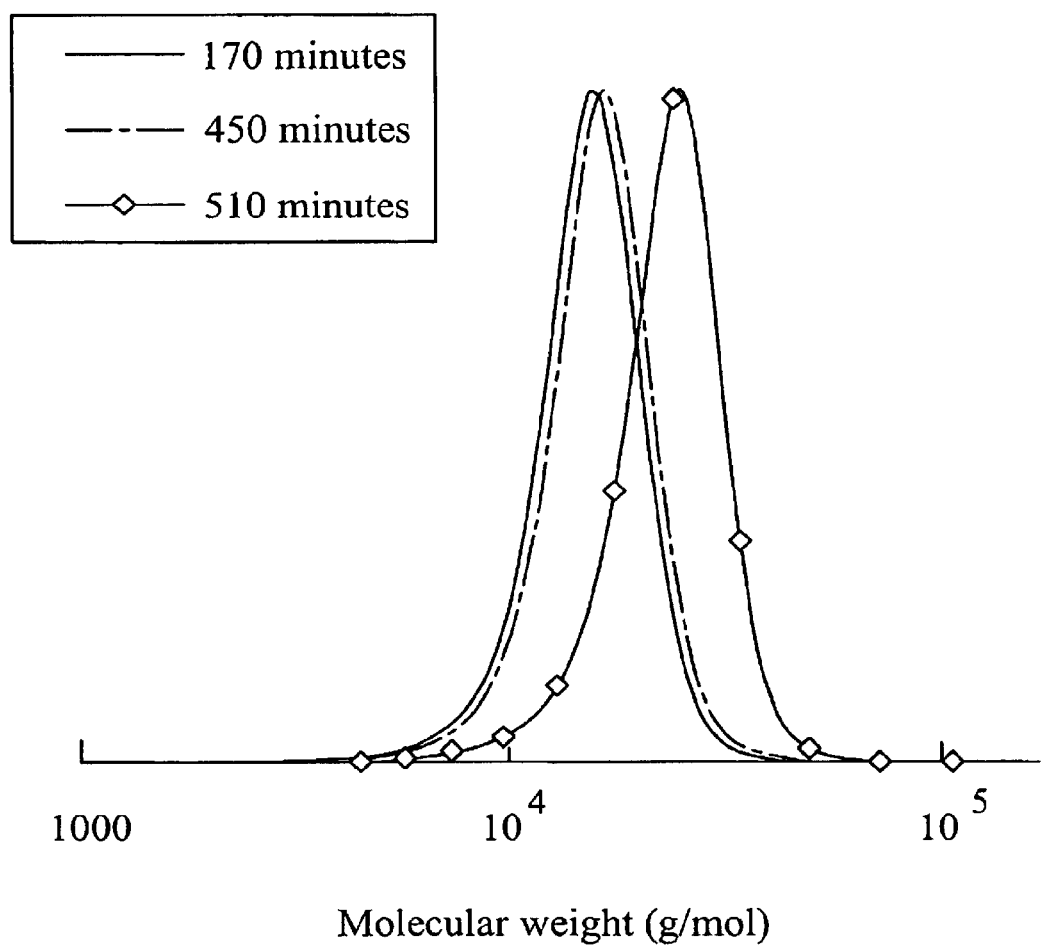
FIG. 7 is a plot of the GPC traces before and after addition of catalyst in the lower oxidation state $[BA]_0$=6.62 M (12.5 mL); $[CuBr_2/Me_6\text{-}TREN]_0$=0.0033 M; $[MBP]_0$=0.016–0.066 M; $[AIBN]_0$=0.0020 M; MeOH (5 vol %); 450 minutes at 90° C. followed by the addition of a solution of $CuBr/Me_6$-TREN in BA ($[BA]'_0$=6.62 M (12.5 mL); $[CuBr/Me_6\text{-}TREN]'_0$=0.0033 M.

The hypothesis that the chain were still living, was also verified by a second simple experiment. As can be seen in FIG. 7, under the SR&NI conditions comprising $[BA]_0=6.62$ M (12.5 mL); $[CuBr_2/Me_6\text{-}TREN]_0=0.0033$ M; $[MBP]_0=0.016$–$0.066$ M; $[AIBN]_0=0.0020$ M; MeOH (5 vol %); 450 minutes at 90° C. then addition of a solution of $CuBr/Me_6\text{-}TREN$ in BA ($[BA]'_0=6.62$ M (12.5 mL); $[CuBr/Me_6\text{-}TREN]'_0=0.0033$ M, the molecular weight of the polymer did not change dramatically between 170 and 450 minutes. After 450 minutes, a solution of catalyst in the lower oxidation state, $CuBr/Me_6\text{-}TREN$, in butyl acrylate was added to the polymerization mixture. The polymerization resumed immediately. The resulting GPC trace from polymer obtained 1 hour after this addition showed a clear increase of the molecular weight. The GPC curve was symmetrical without tailing. This result agrees with observations in the chain extension experiments, discussed later, and provides further evidence that low level of termination reactions result in conversion of low levels of active Cu(I) into Cu(II) during the polymerization thereby slowing down the polymerization while retaining active chain ends. As mentioned elsewhere in the application, this reduction in the rate of polymerization can be circumvented by employing a standard free radical initiator system that decomposes throughout the reaction to continuously convert Cu(II) to Cu(I) by extraction of the transferable atom or group.

The general utility of embodiments of the present invention comprising standard free radical initiators and normal ATRP initiators for catalyst activation and initiation, for controlled polymerization employing a highly active catalysts in bulk and solution polymerization is further demonstrated by the preparation of macroinitiators with the dual initiator process for further chain extension reactions. Synthesis of well-defined amphiphilic block copolymers is used to confirm the remaining functionality on polymers of the living polymerization process. Polymers prepared with standard ATRP systems and by simultaneous reverse and normal initiation (SR&NI) are compared to evaluate the efficiency of both procedures for preparation of macroinitiators for subsequent chain extension. This analysis indicates that chain end functionality, reflecting the living nature of the polymerization, is as high with SR&NI as with standard ATRP systems and that the standard free radical initiator reduces the transition metal from the higher oxidation deactivator state to the activator state and initiates polymerization, but does not substantially contribute to the number of radical termination reactions with the growing polymer chains.

Dual Initiation in Emulsion and Miniemulsion Polymerizations

Figure 8:
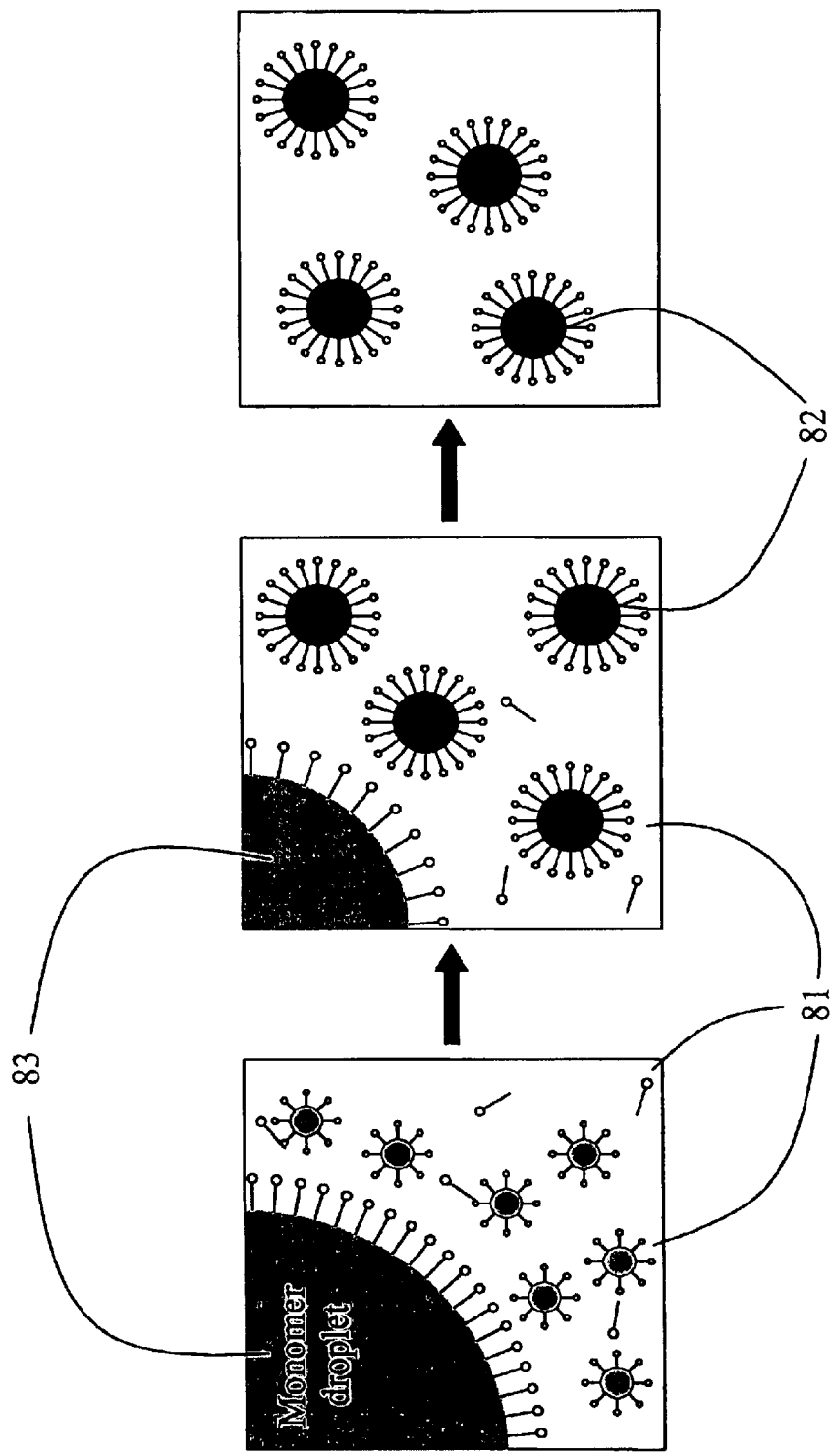
FIG. 8 is a graphical representation of a controlled radical emulsion polymerization process.
Figure 9:
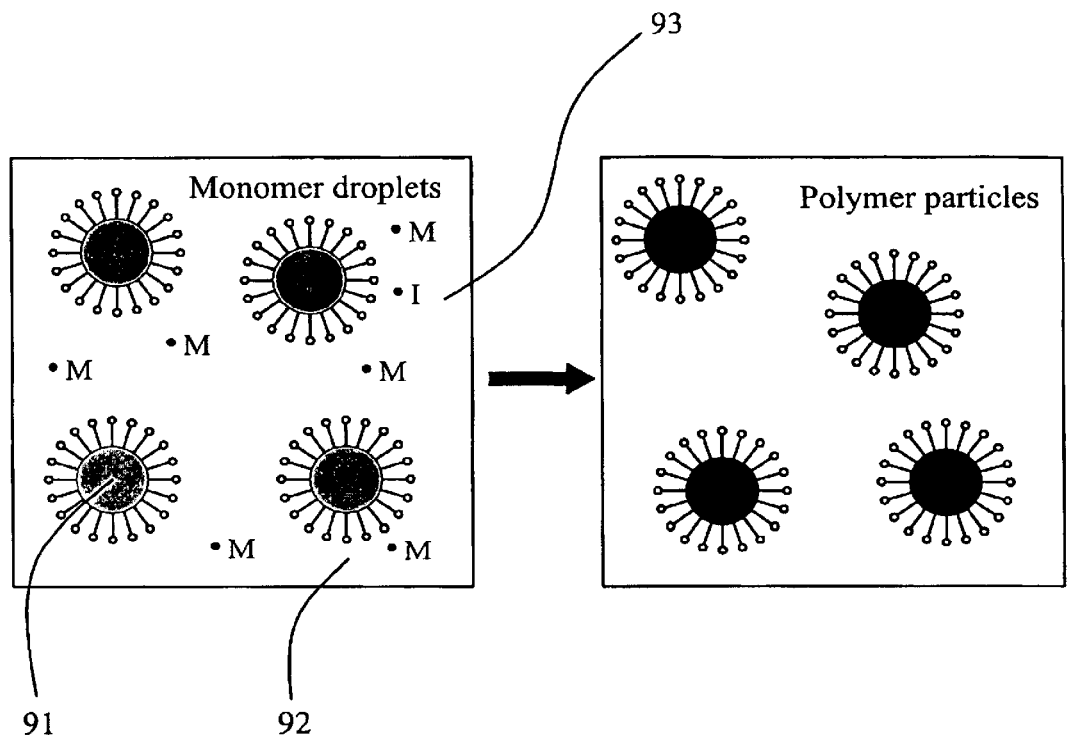
FIG. 9 is a graphical representation of a controlled radical miniemulsion polymerization process.

Embodiments of the present invention may be conducted in bulk, in solution, in emulsion, and miniemulsion systems and for polymerization from surfaces. The embodiments of the present invention overcomes some limitations presently encountered in biphasic or multi-phasic processes, such as emulsion, mini-emulsion, suspension polymerization and heterogeneous surface polymerization. In emulsion and miniemulsion polymerization, the catalyst is should be present and active in all phases of the heterogeneous reaction medium in order to attain optimum control over the polymerization. See U.S. Pat. No. 6,121,371. An ATRP emulsion process comprising only one type of initiator, either a normal or reverse ATRP is shown in FIG. 8. Typically, high concentrations of surfactant 81 may be needed to attain a stable polymerization system comprising monomers 83. However, even with a high concentration of surfactant 81, the emulsion may only be able to comprise a low solids 82 content to maintain a controlled polymerization process. Additionally, the substituents on the ligands have to be selected to allow sufficient solubility in each phase and for sufficient diffusion between phases.

The use of a SR&NI system for an emulsion polymerization takes advantage of the inherent differences in solubility between the Cu(I) and Cu(II) complexes to provide a more even distribution of initiating species in the organic phase and the aqueous phase. Generally, the Cu(II) complexes are more soluble in water and a reverse ATRP initiation may take place with the added standard free radical initiator, optionally a water soluble initiator, in the aqueous phase, as in a standard free radical emulsion polymerization. As the catalyst complex is reduced to Cu(I) by transfer of the transferable atom or group, the catalyst migrates to the organic phase or growing particles and may then initiate a normal ATRP. The organic phase comprises the monomers and the growing polymers. The SR&NI system for catalyst activation and polymerization initiation will set up the required dynamics of an emulsion polymerization much faster than either initiator system alone, allows for use of lower levels of surfactants and allows the use of much more active catalysts. With more active catalysts, lower concentrations of the transition metal may be needed in the process to provide the desired catalytic activity.

Figure 10A:
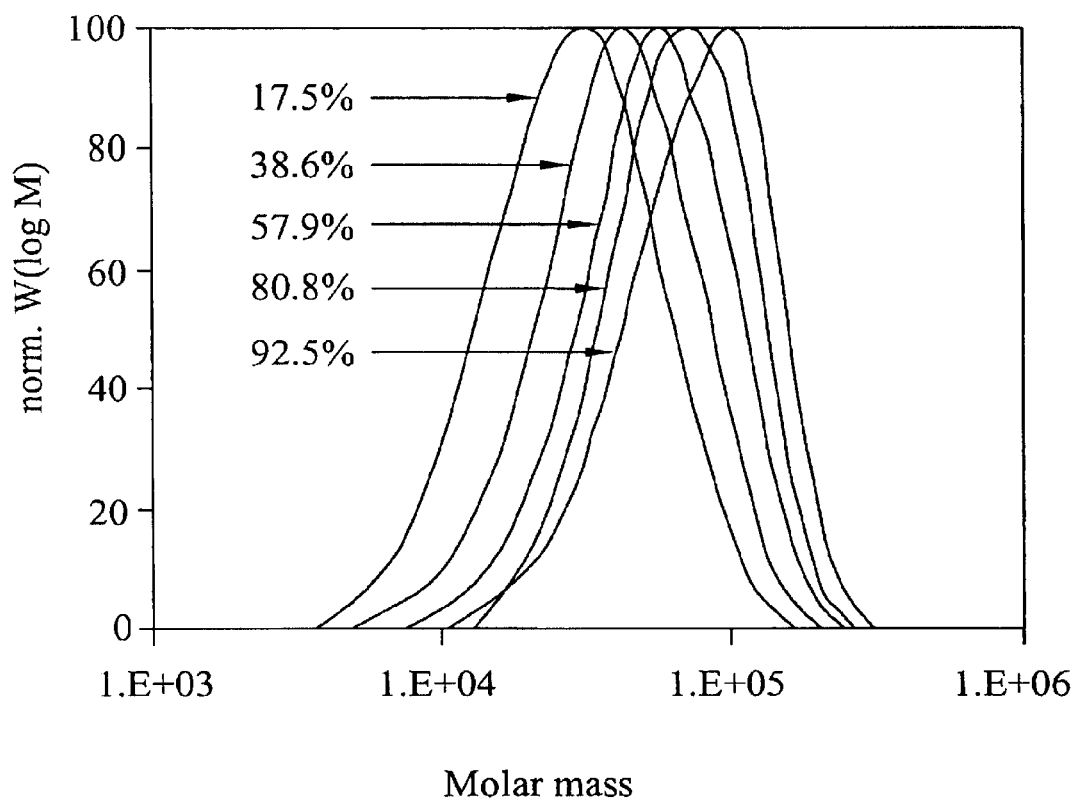
FIG. 10A is a plot of the progression of the molecular weight distribution during a miniemulsion polymerization embodiment of the present invention at various monomer conversions.
Figure 10B:
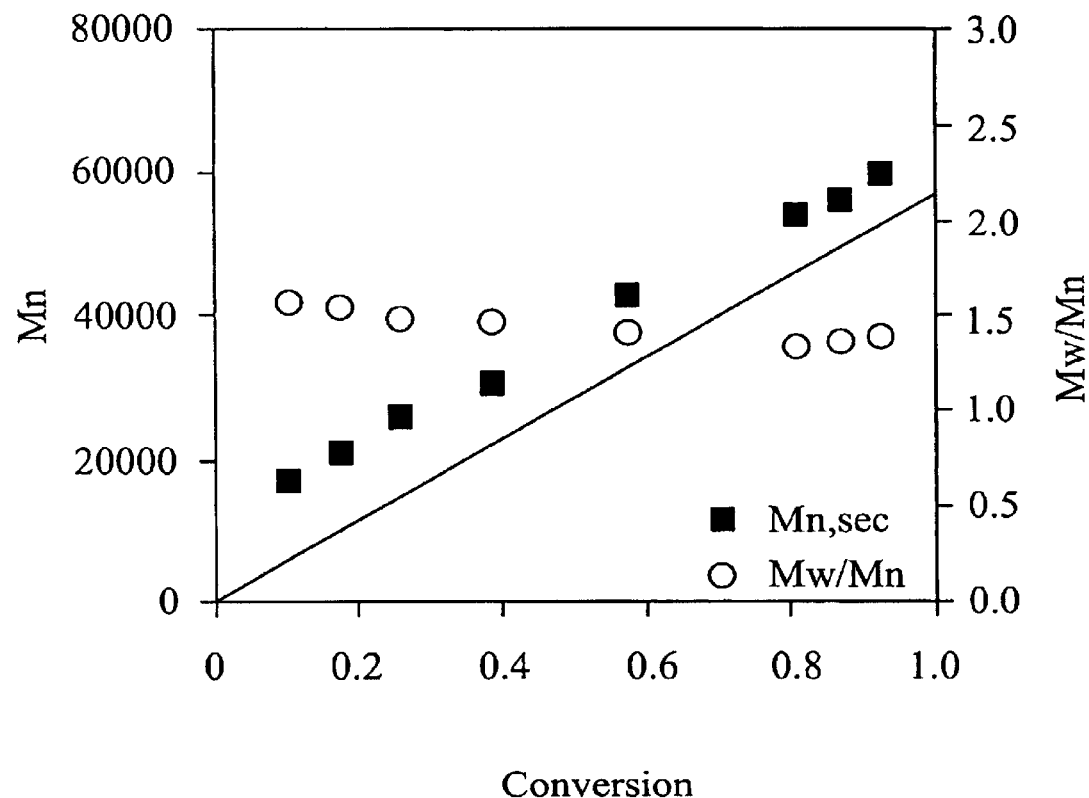
FIG. 10B is a graph of a number average molecular weight and the molecular weight distribution versus monomer conversion for a miniemulsion polymerization embodiment of the present invention.

An advantage for controlled/living radical polymerization conducted in miniemulsions systems is that droplet nucleation limits the need for transportation of the control/transfer agent through the aqueous medium, see FIG. 10, and therefore, the selection of the normal ATRP initiator and catalyst ligands may be made independently of diffusion concerns. In one embodiment, hydrophobic macroinitiators 93 may be used to prepare amphiphylic block copolymers. In this embodiment, the macroinitiator may be pre-dissolved in the components of the droplets 91 along with monomer. In certain embodiments, reactive surfactants 92, which can act either as macroinitiators or macromonomers, may be employed. These conditions are summarized in FIG. 10A and FIG. 10B where conditions for a SR&NI reaction are detailed and it is seen that the reaction provides a well controlled polymerization, molecular weight increases with conversion, FIG. 10B, and molecular weight distribution is narrower than in the pure reverse ATRP system, FIG. 10A. In this embodiment, less than 50% Cu is required to maintain activity and retain control than in a reverse initiation process comprising the same active catalyst.

A practical advantage of SR&NI in emulsion and miniemulsion systems emerges from the fact that it is very difficult to remove traces of oxygen from aqueous systems, particularly during the processing required to form the emulsion or mini-emulsion. The oxygen may deactivate the lower oxidation state catalysts. If the catalyst is present only at low concentrations, this problem is amplified. The presence of an added standard free radical initiator may continue to activate the added catalyst complex in the higher oxidation state as it reacts with any dissolved oxygen, the amount of additional free radical initiator would be determined by experience in a commercial environment where operating conditions are reproducible.

A further benefit of the SR&NI initiating system is that functional standard ATRP initiators can now be used along with oxygen tolerant higher oxidation state transition metal complexes. Functional initiators can be selected to comprise function groups useful in subsequent reactions, such as, reaction of the polymer with a substrate or allow chain extension in other polymerization reactions. All these innovations lead to a lower cost more robust polymerization system with no reduction in control, indeed with added control, over the materials prepared by prior art processes, including water based processes.

As indicated above, these embodiments may be beneficially performed in a mini-emulsion, rather than an emulsion system, since initiation can occur in the monomer droplet. A reverse initiation procedure with a water-soluble initiator was used allowing addition of the transition metal in the higher oxidation state. The use of a miniemulsion process also allowed a reduction in the concentration of surfactant from 17.5 mM to 5 mM; an increase in solids content from 13% to 30% in some embodiments, and use of more active catalyst systems. There was little effect on catalyst activity on changing the ligand from $BA_6$-TREN, to $EHA_6$-TREN, to $LA_6$-TREN in the miniemulsion process, although in an emulsion system there was discernable difference in control as one moved from the very hydrophobic $LA_6$-TREN to the less hydrophobic $BA_6$-TREN. Catalysts based on $BA_6$-TREN were suitable for acrylate polymerization in emulsion polymerization due to a minimal ability to diffuse to the growing particle along with the monomer.

The utility of the ligands employed for the preparation of active transition metal complexes for use in emulsion/miniemulsion depends on their molecular structure. Bipyridine type ligands, such as dNbpy (MW=408), are more compatible with BMA than TREN-based ligands (i.e. $LA_6$TREN, $EHA_6$TREN, and $BA_6$TREN) this means that there would be few diffusion based problems with dNbpy as ligand in an emulsion polymerization and indeed it worked well for ATRP in conventional emulsion polymerization as demonstrated in U.S. Pat. No. 6,121,371. However, catalysts based on hydrophobic TREN-based ligands, while much more active than bipyridine catalysts in bulk polymerizations, do encounter diffusion difficulties in standard ATRP emulsion systems due to their branched molecular structure and high molecular weight ($MW_{LA6TREN}$=1588, $MW_{EHA6TREN}$=1250, and $MW_{BA6TREN}$=914).

Catalysts comprising $LA_6$TREN as a ligand resulted in controlled polymerization for normally initiated ATRP only in a pure miniemulsion case, based on the absence of micelles in the system (due to low surfactant concentration), since the resulting catalysts prefer to stay in the oil phase (i.e. miniemulsion droplets), like the costabilizer. The use of $EHA_6$TREN, which is less hydrophobic and has a lower MW than $LA_6$TREN, result in the formation of catalysts that provide for some control polymerization in a miniemulsion case (regardless of the surfactant concentration) but with the formation of considerable amount of coagulum. In the case of a $BA_6$TREN based catalyst system a better controlled polymerization was observed, even in the conventional emulsion case (but with formation of a certain amount of coagulum).

Although dNbpy is a suitable ligand for preparation of catalysts active in emulsion systems from the structure point of view, the catalytic activity is much lower than TREN-based ligands, at least double amount of the copper species is required, and requires higher reaction temperature.

In the miniemulsion process the expected temperature effect was demonstrated using V-044 as standard free radical initiator. The rate of reaction increased from 20% conversion in 100 minutes to complete conversion in 100 minutes on increasing the temperature from 60° C. to 70° C. (V-044:$t_{1/2}$=60 min at 60° C.; $t_{1/2}$=15 min at 70° C.) with only a slight increase in molecular weight distribution.

Changing the amount of normal ATRP initiator added to the reaction allowed preparation of polymer with controlled final molecular weight up to 110,000 while adding the same amount of Cu and standard free radical initiator.

Dual Initiation from Surfaces

An embodiment of the present invention also comprises polymerization from surfaces where a standard ATRP initiator can be attached to the surface and a standard reverse ATRP initiation process can be run in the contacting solution. In this way, an oxidatively stable catalyst complex may be added to the reaction and activated by decomposition of a standard free radical initiator to form the reduced active catalyst in the lower oxidation state. The reduced transition metal complex may then activate the attached normal ATRP initiators to synthesize tethered graft polymers. The ratio between the number of radicals generated in solution and the added higher oxidation state catalyst complex can be balanced to provide an appropriate ratio of oxidation states in the catalyst in the contacting solution. In certain embodiments, higher levels of the transition metal in a higher oxidation state are desired in biphasic systems to control the polymerization.

Experimental Procedures $Me_6$-TREN and substituted TREN ligands, including a series of acrylate substituted ligands, [$BA_6$-TREN, $EHA_6$-TREN, $LA_6$-TREN and $Si_6$-TREN] were synthesized using procedures described in the literature. Monomers were vacuum distilled over $CaH_2$ and stored under nitrogen at −15° C. Copper halides were stirred in glacial acetic acid, filtered, washed with absolute ethanol and dried under vacuum. Alkyl halide (RX), solvents and internal standard were used as received.

(Generic) Example 1

In a typical bulk ATRP experiment, CuX or $CuX_2$, AIBN (if applicable), monomer, solvent and internal standard were placed in a Schlenk flask and degassed by 3 freeze-pump-thaw cycles. To this solution, pre-degassed ligand, then initiator, or macroinitiator in solution, were added and the reaction flask was immersed in an oil bath at desired temperature. At timed intervals, samples were taken out and diluted in THF for analysis. Monomer conversion was determined from the concentration of residual monomer by GC using p-dimethoxybenzene as internal standard and molecular weight distributions were measured by GPC with THF as eluent at 25° C.

(Generic) Example 2

Figure 11:
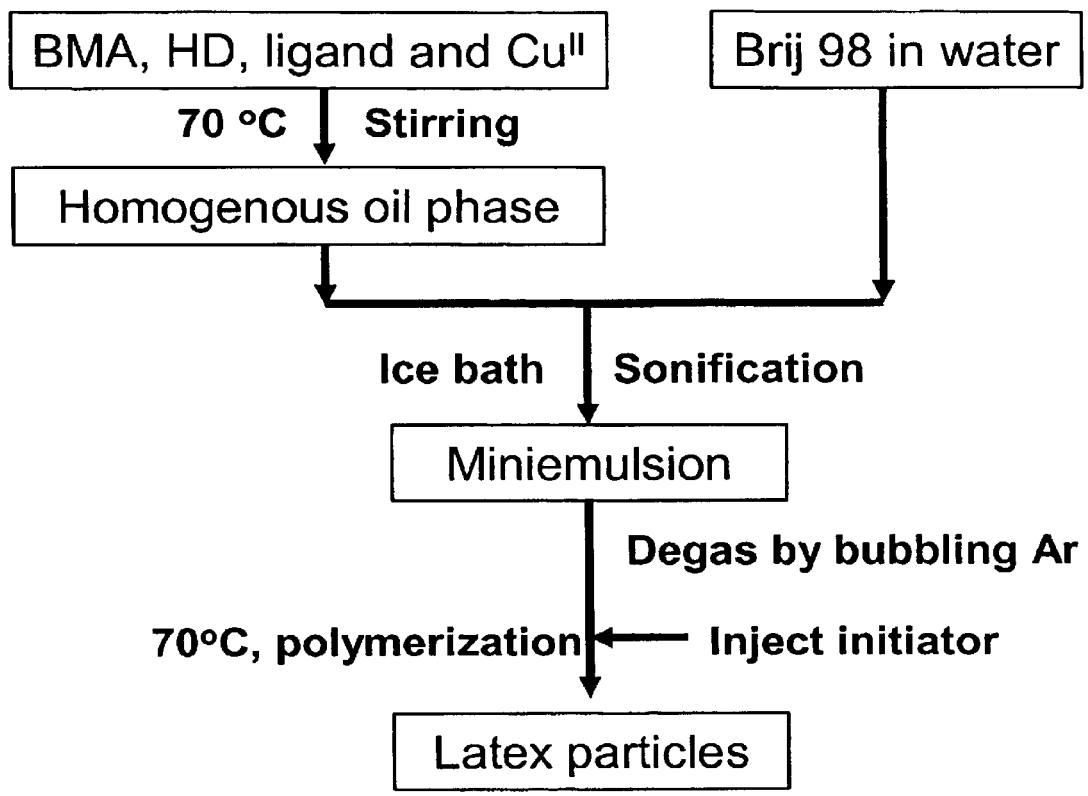
FIG. 11 show the procedure used in an ATRP miniemulsion polymerization.
Figure 13:
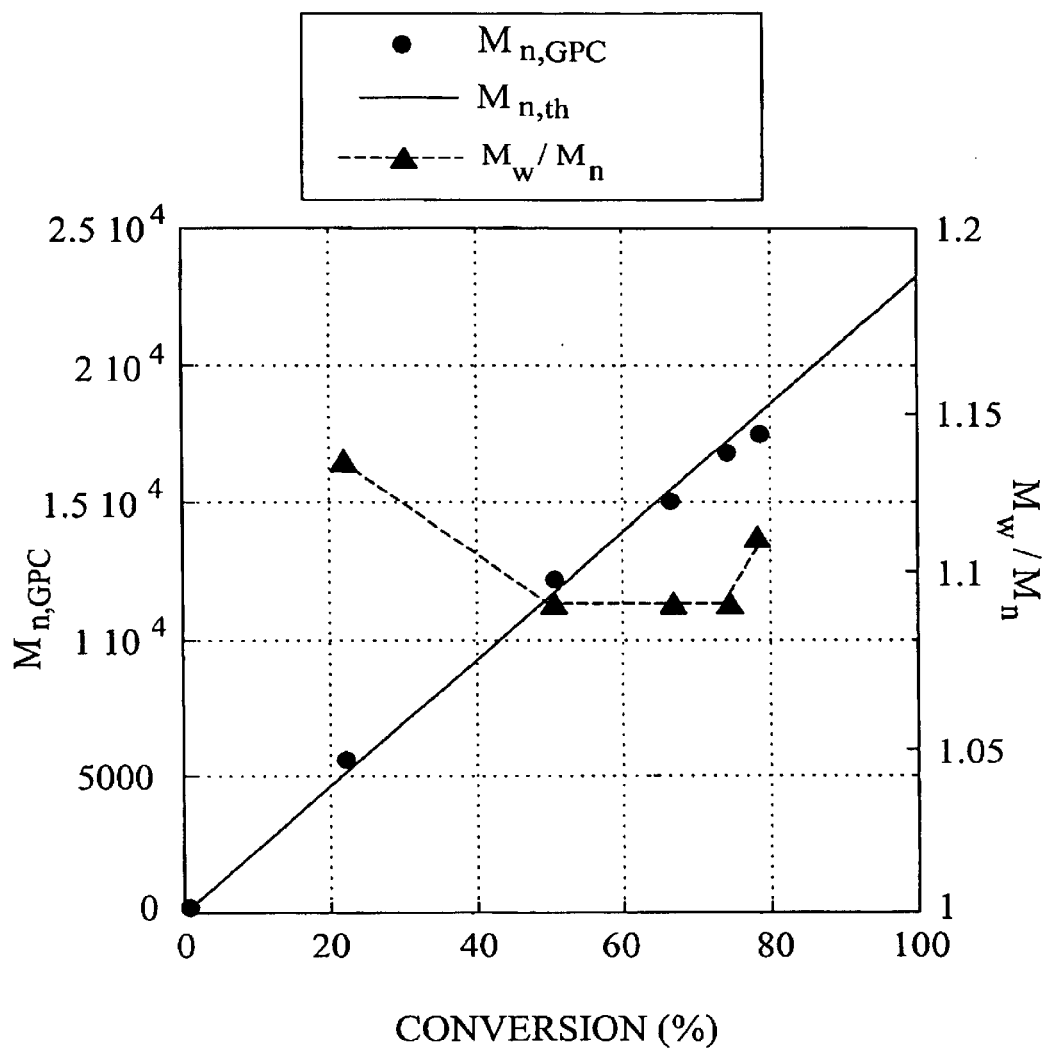
FIG. 13 is a graph of a number average molecular weight versus monomer conversion for an embodiment of an ATRP of the present invention of n-butyl acrylate initiated by both an initiator comprising a transferable atom or group and a standard free radical initiator conducted at 90° C.

In a typical miniemulsion polymerization, see FIG. 11, the monomer, co-surfactant (hexadecane), ligand and Cu(II) were stirred together, Step 1, at 70° C. to form a homogeneous oil phase, Step 2. A surfactant was added, Step 3, and the entire system was cooled in an ice bath to room temperature. The system under went sonification to form a miniemulsion and degas the mixture, Step 4. An initiator is added, Step 5, and the polymerization is run at approximately 70° C. Using this procedure, a product comprising at least 20% solids may be synthesized. When laurylacrylate based ligands were used no added co-surfactant was required. The miniemulsion was formed by sonification and then degassed by bubbling with argon. The miniemulsion was then heated to 70° C. and the standard free radical initiator injected into the system. A stable polymer latex was formed. As in the bulk system when SR&NI was employed the normal ATRP initiator is added to the monomer mixture. GPC traces of polymer samples taken during the polymerization showed a linear increase in molecular weight with conversion and the molecular weight distribution was less than 1.4, both measurements indicate a well controlled polymerization, (FIG. 13).

Example 3

The bulk polymerization of n-butyl acrylate was investigated using an embodiment of the present invention employing the following standard conditions: $[BA]_0/[RX]_0/[Cu(II)/L]_0/[AIBN]_0=200/1/0.1/0.06$ at 90° C. A graph indicating the growth in number average molecular weight versus monomer conversion is shown in FIG. 3, circles. A small amount of methanol (5 vol. %) was added to the polymerization mixture in order to solubilize $CuBr_2/Me_6$-TREN, which is usually poorly soluble in non-polar media. Under these conditions, a homogeneous controlled/"living" polymerization occurs leading to the synthesis of poly(n-butyl acrylate) (pBA) with predetermined molecular weight and with low polydispersity ($M_w/M_n<1.15$).

Example 4

Embodiments of the present invention comprising simultaneous reverse and normal initiation allows the preparation of well-defined polymers with functionality, using a very small amount of catalyst. The efficacy of the system was confirmed by chain extension and synthesis of various block copolymers. A polybutyl acrylate macroinitiator was chain extended with t-butyl acrylate (t-BA) using a $CuBr/Me_6$-TREN catalyst and dimethylamino)ethyl methacrylate was polymerized using $CuCl/Si_6$-TREN as catalyst. The results are summarized in Table 5.

TABLE 5

Block copolymerization of pBA with t-BA and DMAEMA.

| Initiation method | $M_{n,GPC}$ macro initiator | $M_w/M_n$ macro initiator | monomer | $M_{n,GPC}$ diblock | $M_w/M_n$ diblock |
|---|---|---|---|---|---|
| Normal ATRP | 23500 | 1.11 | t-BA | 41500 | 1.13 |
| Normal ATRP | 23500 | 1.11 | DMAEMA | 41500 | 1.28 |
| SR&NI | 20000 | 1.18 | t-BA | 39900 | 1.21 |
| SR&NI | 20000 | 1.18 | DMAEMA | 41200 | 1.36 |

$[pBA]_0 = 0.012$ M; $[CuBr/Me_6\text{-TREN}]_0 = 0.003$ M; $[t\text{-BA}]_0 = 2.01$ M; anisole 70 vol %; 24 hours, 20° C. $[pBA]_0 = 0.012$ M; $[CuBr/Si_6\text{-TREN}]_0 = 0.012$ M; $[DMAEMA]_0 = 2.4$ M; anisole (60 vol %); 12 hours, 90° C..

The chain extension experiments to form block copolymers starting with macroinitiators prepared by both normal initiation and simultaneous reverse and normal initiation show similar results, indicating a similar high level of chain end functionality, through living polymerization, irrespective of the mode of initiation.

In this series of chain extension examples the broad utility of embodiments of SR&NI were further exemplified by the successful synthesis of amphiphilic block copolymers from polybutyl acrylate macroinitiators synthesized by embodiments of the present invention for chain extension with polar monomers. The low concentration of active transition metal catalyst, inherent in very active catalyst systems may be more cost effectively removed from the system than the greater levels of less active catalyst.

Example 5

Typical conditions for embodiments of the present invention in a miniemulsion polymerization follows: monomer, BMA, (5 g); co-surfactant hexadecane (0.18 g, 3.6% based on monomer); $EHA_6$-TREN (0.11 g) and Cu(II) (0.197 g); Brij 98 (115 g) in water (20 g) and VA-044 (0.0284 g) as the standard free radical initiator. The procedure outlined in FIG. 11 was followed. The molecular weight of the polymer increased linearly with conversion and the molecular weight distribution of the polymer samples were 1.5 indicating a controlled polymerization. The polymerization resulted in a 20% solids content. The resulting colloid has good stability and no coagulum was observed during the polymerization.

(Comparative) Example 6

Figure 14:
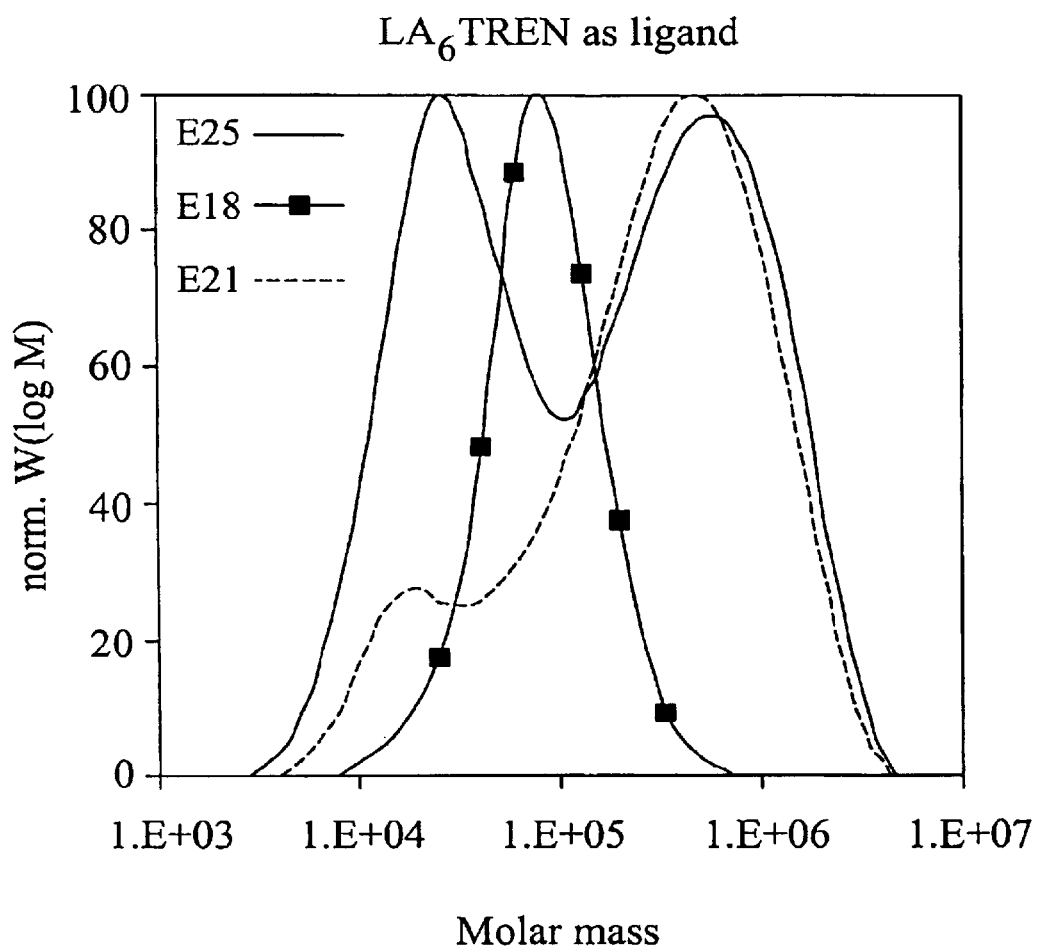
FIG. 14 is a graph showing the effect of surfactant concentration of emulsion polymerization using LA$_6$TREN.

Emulsion polymerizations run with only normal ATRP initiators using the hydrophobic $LA_6$-TREN ligand, rather than the more hydrophilic dNbpy ligand, were uncontrolled (except run E18) and the reproducibility was rather poor when using $LA_6$TREN as ligand. See Table 6. The molecular weight of the final polymer showed bimodal distribution in most of the cases, see FIG. 14. By monitoring the reaction kinetics, it was seen that a high molecular weight ($>10^6$) moiety was produced primarily at the beginning of the reaction (0–30% conversion). This suggests that there were two polymerization mechanisms this system, one a conventional free radical polymerization that produces polymer with higher molecular weight ($>10^6$) moieties, and ATRP which forms the lower molecular weight ($10^4$) moieties.

TABLE 6

Selected Experiments[a] of ATRP in Minimulsion Using $LA_6$TREN as Ligand

| Exp. | $[M]/[I]/[Cu^{2+}]/[L]$ | $Cu^{2+}$ Species | R.T. (° C.) | Conv. | $M_{n,sec}$ | $M_{n,theo}$ | $M_w/M_n$ |
|---|---|---|---|---|---|---|---|
| E15 | 400/1/1.5/1.5 | $CuBr_2$ | 60 | 95.9% | 14,607 | 54,471 | 2.07[b] |
| E18 | 400/1/1/1 | $CuBr_2$ | 60 | 99.3% | 58,086 | 56,402 | 1.59 |
| E19 | 400/1/0.5/0.5 | $CuBr_2$ | 60 | 99.9% | 203,310 | 56,800 | 3.76[b] |
| E21 | 400/1/1.5/1.5 | $CuBr_2$ | 60 | $CuBr_2$ | 60 | 56,800 | 8.10[b] |
| E29 | 400/1/1.5/1.5 | $CuBr_2$ | 50 | 92% | 39,540 | 52,256 | 12.8[b] |
| E30 | 400/1/1/1 | $CuBr_2$ | 50 | 100% | 107,110 | 56,800 | 6.6[b] |
| E31 | 400/1/1/1 | $CuCl_2$ | 60 | 100% | 308,350 | 56,800 | 2.57 |
| E32 | 400/1/1.5/1.5 | $CuCl_2$ | 60 | 100% | 42,958 | 56,800 | 7.20[b] |

[a]Water soluble azo-initiator, V-044, was used as initiator;
[b]bimodal distribution The recipe used in the above set of examples, contained a large amount of surfactant, 17.4 mM Brij 98, based on the aqueous phase, and with this high surfactant concentration, micelles and monomer droplets will coexisted even in the miniemulsion system. The addition of a water soluble initiator, V-044, may therefore initiate both micelle nucleation and droplet nucleation. As $LA_6$TREN is very hydrophobic ligand with the long chain acrylate incorporated in the molecule it would be prefer to stay in the miniemulsion droplets, like the costabilizer. The diffusion of the catalyst (copper-LA$_6$TREN) would be highly retarded. As a result, the particles produced via micelle nucleation would undergo an uncontrolled conventional free radical polymerization due to the absence of copper complex as activator/deactivator. A controlled ATRP would only take place in the monomer droplets that contained LA$_6$TREN.

Example 7

Controlled ATRP using LA$_6$TREN for BMA polymerization in a miniemulsion process was achieved by decreasing the surfactant concentration to 5 mM. Under these conditions no coagulaum was observed in the final latexes; the experiments showed a great reproducibility (Table 7), and the lack of any high molecular weight species in the final polymer implied that particles were produced mainly via droplet nucleation, where the Cu (I) and Cu (II) complexed LA$_6$TREN with served as an efficient activator/deactivator.

TABLE 7

Reversed ATRP of Miniemulsions Using LA$_6$TREN as Ligand

| Exp | [M]/[I]/ [CuBr$_2$]/[L] | Monomer | Conv. | M$_{n,sec}$ | M$_{n,theo}$ | M$_w$/M$_n$ |
|---|---|---|---|---|---|---|
| E40 | 400/1/1/1 | BMA | 65.3% | 32,636 | 37,090 | 1.59 |
| E44 | 400/1/1/1 | BMA | 100% | 57,877 | 56,800 | 1.61 |
| E43 | 400/1/1/1 | BA | 92.0% | 40,529 | 47,104 | 1.70 |

Solid content = 20%; Hexadecane = 3.6–3.75% based on monomer; 0.58% Brij98 in water (5 mM); Water soluble azo-initiator, V-044, was used as initiator.

In the miniemulsion process increasing the ratio of Cu(II) to V-044 from 1:1 to 2:1, which will increase the amount of Cu(II) remaining in the system, significantly decreased the rate of polymerization from complete conversion at 200 minutes to 40% conversion after 300 minutes with only a slight decrease in MWD to indicate better control.

Example 8

The embodiment of a successful miniemulsion process allows the use of more active catalysts, such as those derived from TREN, for the preparation of (co)polymers with degree of polymerization up to 800 in one hour with good control over MWD producing stable latexes with 20% or 30% solids.

Figure 12:
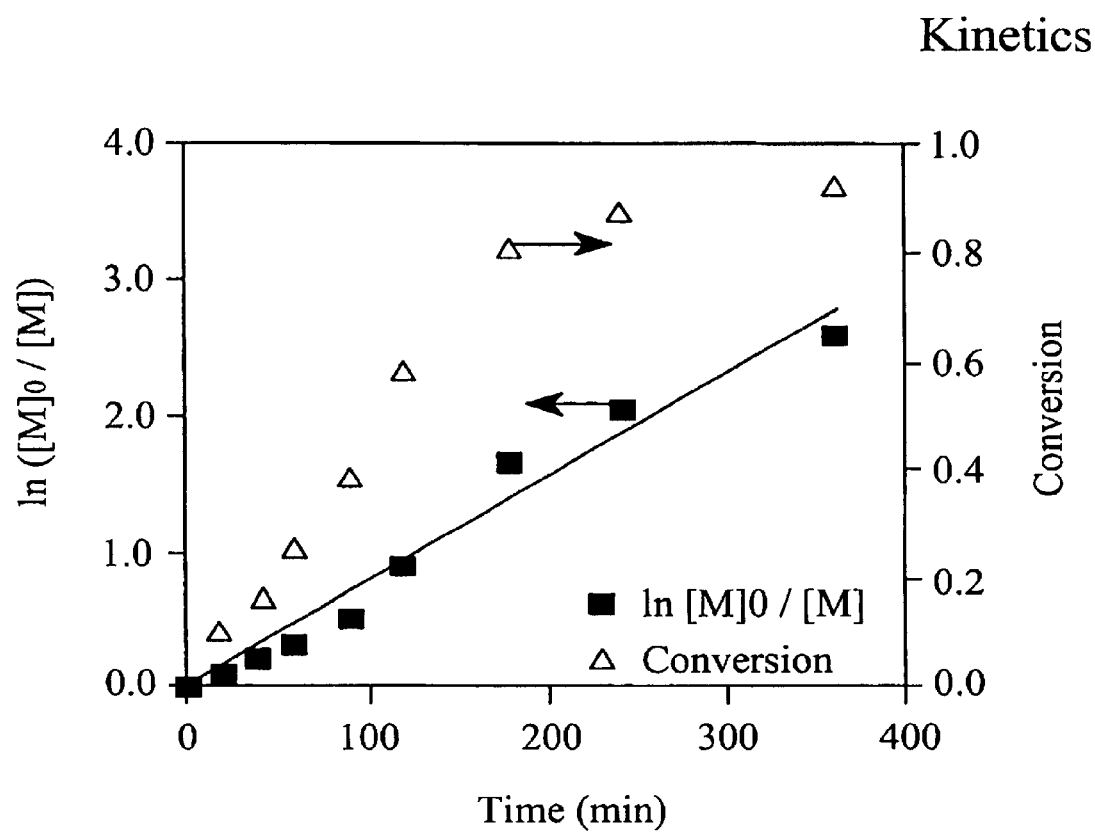
FIG. 12 is a graph of a In[M]$_0$/[M] versus time for an embodiment of an miniemulsion ATRP of the present invention initiated by both an initiator comprising a transferable atom or group, Ebr/B (1 euivalent), and a standard free radical initiator, AIBN (0.25 equivalent), and catalyzed by CuBr$_2$/Me$_6$-TREN conducted at both 60° C. and 90° C.

Conditions for a miniemulsion polymerization employing SR&NI follows: BMA, monomer (5 g), co-surfactant, hexadecane (0.18 g), EHA$_6$-TREN (0.055 g), Cu(II) (0.098 g), ethylbromoisobutyrate (0.0172 g), Brij 98, C$_{12}$H$_{25}$(OC$_2$H$_5$)$_{20}$OH (0.115 g) in water (20 mL) and AIBN (0.0037 g) as the standard free radical initiator. See FIG. 12. The reaction was run at 70° C., which is low for a typical AIBN initiated polymerization; however, the molecular weight increased linearly with conversion reaching high conversion in 300 minutes with narrow molecular weight distribution, MWD=1.4.

Example 9

In the examples detailed above Brij 98 was used as an exemplary surfactant however as known to one skilled in the art other surfactants meeting the criteria described in U.S. Pat. No. 6,121,371 would also be useful. Presently reactive surfactants are available for use in emulsion and miniemulsion polymerizations. This is exemplified by a polymerization described in Table 8 where NOIGEN RN 20, see Formula 1, a polymerizable surfactant was successfully incorporated into an ATRP mini-emulsion polymerization.

TABLE 8

Examples of mini-emulsion polymerizations with high solids content and a reactive surfactant

| Monomer | [E] | Solid content | Conv. | M$_{n,theo}$ | M$_n$ | M$_w$/M$_n$ |
|---|---|---|---|---|---|---|
| BMA | 5 mM Brij 98 | 20% | 98.8% | 63,300 | 56,100 | 1.53 |
| BMA | 7.5 mM Brij 98 | 30% | 98.7% | 60,400 | 56,100 | 1.52 |
| BA | 5 mM Brij 98 | 20% | 92% | 40,500 | 47,100 | 1.70 |
| BMA | 5 mM NOIGEN RN 20 | 20% | 91% | 49,200 | 51,700 | 1.55 |

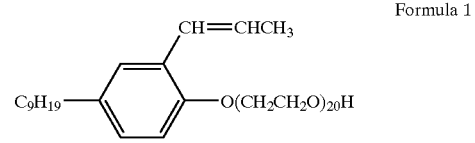

Formula 1

NOIGEN RN 20

It is to be understood that the present description illustrates those aspects of the invention relevant to a clear understanding of the invention. Certain aspects of the invention that would be apparent to those of ordinary skill in the art and that, therefore, would not facilitate a better understanding of the invention have not been presented in order to simplify the present description. Although the present invention has been described in connection with certain embodiments, those of ordinary skill in the art will, upon considering the foregoing description, recognize that many modifications and variations of the invention may be employed. All such variations and modifications of the invention are intended to be covered by the foregoing description and the following claims.

References
(1) Matyjaszewski, K.; Editor Controlled/Living Radical Polymerization. Progress in ATRP, NMP, and RAFT In: ACS Symp. Ser., 2000; 768, 2000.
(2) Matyjaszewski, K.; Xia, J. Chem. Rev. 2001, 101, 2921–2990.
(3) Kamigaito, M.; Ando, T.; Sawamoto, M. Chem. Rev. 2001, 101, 3689–3745.
(4) Wang, J. -S.; Matyjaszewski, K. J. Am. Chem. Soc. 1995, 117, 5614–5615.
(5) Wang, J. -S.; Matyjaszewski, K. Macromolecules 1995, 28, 7572–7573.
(6) Xia, J.; Matyjaszewski, K. Macromolecules 1997, 30, 7692–7696.
(7) Qiu, J.; Matyjaszewski, K.; Thouin, L.; Amatore, C. Macromol. Chem. Phys. 2000, 201, 1625–1631.
(8) Gromada, J.; Matyjaszewski, K. Macromolecules 2001, 34, 7664–7671.
(9) Queffelec, J.; Gaynor, S. G.; Matyjaszewski, K. Macromolecules 2000, 33, 8629–8639.
(10) Zeng, F.; Shen, Y.; Zhu, S.; Pelton, R. Macromolecules 2000, 33, 1628–1635.
(11) Buback, M.; Huckestein, B.; Kuchta, F. -D.; Russell, G. T.; Schmid, E. Macromol. Chem. Phys. 1994, 195, 2117–2140.

What is claimed is:
1. A polymerization process, comprising:
polymerizing free radically polymerizable monomers in the presence of a system initially comprising:

a catalyst comprising:
  a transition metal compound in a higher oxidation state, wherein the transition metal compound is capable of participating in a redox reaction; and
  a ligand that forms an active complex with the transition metal compound;
a standard free radical initiator; and
an ATRP initiator with a transferable atom or group, wherein the transferable atom group is homolytically cleavable by the transition metal in a lower oxidation state thereby activating the initiator for monomer addition and a ratio of moles of transition metal to moles of the initiators is less than 1:1.

2. The polymerization process of claim 1, wherein the polymerization process is one of a bulk polymerization, conducted in a solvent, an emulsion, mini-emulsion polymerization process, and a biphasic process wherein at least one of the initiators is attached to a substrate.

3. The polymerization process of claim 1, wherein the ratio of moles of transition metal to moles of the initiators is less than 1:5.

4. The polymerization process of claim 1, wherein the standard free radical initiator is at least one of dialkyl diazenes, azobis(isobutyronitrile), dimethyl 2,2'-azobisisobutyrate-, 1,1'-azobis(1-cylcohexanenitrile), 2,2'-azobis(2,4,4-trimethylpentane), -azobis-2,4-dimethylvaleronitrile, polymeric or oligomeric materials comprising azo, —N=N—, groups, peroxides, acyl, diacyl peroxides, alkyl peroxides, dialkyl peroxydicarbonates, hydroperoxides, peresters, inorganic peroxides, benzoyl peroxide, peroxy acids, peroxyacetic acid, peroxybenzoic acid, styrenes, acrylates, V-044 and other standard commercial free radical initiators.

5. The polymerization process of claim 1, wherein the initiator comprising the transferable atom or group is attached to a solid surface.

6. The polymerization process of claim 5, wherein the solid surface is at least one of a flat surface or a curved surface.

7. A polymerization process for forming a polymer emulsion, mini-emulsion or suspension, comprising:
  polymerizing one or more radically polymerizable monomers in the presence of a system initially comprising:
    a suspending medium;
    a surfactant;
    a monomer phase suspended in the suspending medium, wherein the monomer phase comprises at least a portion of the monomers,
    an initiator comprising a transferable atom or group;
    an standard free radical initiator; and
    a catalyst comprising a transition metal compound in a higher oxidation state, wherein the transition metal compound is capable of participating in a redox reaction, and a ligand that forms an active complex with the transition metal compound.

8. The polymerization process of claim 7, wherein the suspending medium is an inorganic liquid.

9. The polymerization process of claim 8, wherein the suspending medium is water.

10. The polymerization process of claim 7, wherein the standard free radical initiator is water soluble.

11. The polymerization process of claim 7, wherein the standard free radical initiator is at least one of dialkyl diazenes, azobis(isobutyronitrile), dimethyl 2,2'-azobisisobutyrate, 1,1'-azobis(1-cylcohexanenitrile), 2,2'-azobis(2,4,4-trimethylpentane), azobis-2,4-dimethylvaleronitrile, polymeric or oligomeric materials comprising azo, —N=N—, groups, peroxides, acyl, diacyl peroxides, alkyl peroxides, dialkyl peroxydicarbonates, hydroperoxides, peresters, inorganic peroxides, benzoyl peroxide, peroxy acids, peroxyacetic acid, peroxybenzoic acid, styrenes, acrylates, V-044 and other standard commercial free radical initiators.

12. The polymerization process of claim 7, wherein the initiator comprising a transferable atom or group is at least one of an alkyl halide and substituted esters.

13. The polymerization process of claim 7, wherein the catalyst is involved in a redox reaction between a higher oxidation state and a lower oxidation state.

14. The polymerization process of claim 13, wherein the catalyst in the higher oxidation state is more soluble in the suspending medium and the catalyst in the lower oxidation state is more soluble in the monomer phase and the polymer phase.

15. The polymerization process of claim 9, wherein an organic phase comprises the monomer phase and the polymer phase and a ratio of organic phase to water is between 1:100 and 100:1.

16. The polymerization process of claim 9, wherein the ratio of organic phase to water is between 1:10 and 10:1.

17. The polymerization process of claim 7, wherein the suspending medium is buffered.

18. The polymerization process of claim 7, wherein the ligands are chosen to render both oxidation states of the transition metal complex at least partially soluble in the polymerization phase.

19. The polymerization process of claim 7, wherein the surfactant is a non-ionic surfactant.

20. The polymerization process of claim 7, wherein the surfactant is an ionic surfactant.

21. The polymerization process of claim 20, wherein the surfactant is a cationic surfactant.

22. The polymerization process of claim 7, wherein the surfactant is a reactive surfactant and is integrated into the final polymer.

23. The polymerization process of claim 7, wherein the surfactant is present in a concentration of 0.01% to 50% by weight, based on the weight of the system.

24. The polymerization process of claim 7, wherein the surfactant controls the stability of the emulsion.

25. The polymerization process of claim 24, wherein the surfactant forms a stable emulsion.

26. The polymerization process of claim 7, wherein the initiator comprising the transferable atom or group is soluble in the organic phase.

27. The polymerization process of claim 1, wherein the initiator comprising the transferable atom or group is a macroinititiator.

28. The polymerization process of claim 27, wherein the macroinitiator is prepared in situ.

29. The polymerization process of claim 7, wherein the standard free radical initiator is the last component added to the initial reaction medium.

30. The polymerization process of claim 7, wherein one or more monomers may be added continuously, periodically or sequentially to the polymerization to prepare emulsions or suspensions of statistical, gradient or block copolymers.

31. The polymerization process of claim 30, wherein the one or more monomers are added in bulk or as a second emulsion.

32. The polymerization process of claim 7, further comprising contacting the emulsion with a material that selectively absorbs the transition metal catalyst.

33. The polymerization process of claim 32, wherein said material that selectively absorbs the transition metal catalyst is an ion exchange resin.

34. The polymerization process of claim 7, wherein the suspending medium is an organic medium and the one or more radically polymerizable monomers are dissolved in an inorganic solvent.

35. The polymerization process of claim 1, wherein the ratio of moles of transition metal to moles of the initiators is less than 1:5.

36. The polymerization process of claim 1, wherein the ratio of moles of transition metal to moles of the initiators is less than 1:10.

37. The polymerization process of claim 1, wherein the ratio of moles of transition metal to moles of the initiators is less than 1:20.

38. The polymerization process of claim 1, wherein the ratio of catalyst to standard free radical initiator is between 1:1 and 1:2.

39. The polymerization process of claim 1, wherein the ratio of catalyst to standard free radical initiator is about 1:1.6.

40. The polymerization process of claim 1, wherein a ratio of the initiator comprising the transferable atom or group to the standard free radical initiator is between 40:1 and 5:1.

41. The polymerization process of claim 40, wherein the ratio of the initiator comprising the transferable atom or group to the standard free radical initiator is between 25:1 and 5:1.

42. The polymerization process of claim 41, wherein the ratio of the initiator comprising the transferable atom or group to the standard free radical initiator is between 25:1 and 8:1.

43. The polymerization process of claim 1, wherein the catalyst is highly active.

* * * * *